(12) United States Patent
Oh et al.

(10) Patent No.: US 12,704,954 B2
(45) Date of Patent: Aug. 11, 2026

(54) DISPLAY DEVICE HAVING MUTIPLE DISPLAY AREAS AND METHOD FOR DRIVING THE SAME

(71) Applicant: LG Display Co., Ltd., Seoul (KR)

(72) Inventors: Dae Seok Oh, Paju-si (KR); Yong Hwa Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/818,423

(22) Filed: Aug. 28, 2024

(65) Prior Publication Data

US 2025/0217029 A1 Jul. 3, 2025

(30) Foreign Application Priority Data

Dec. 29, 2023 (KR) ........................ 10-2023-0196746

(51) Int. Cl.
*G06F 3/04886* (2022.01)
*G06F 3/041* (2006.01)

(52) U.S. Cl.
CPC ........ *G06F 3/04886* (2013.01); *G06F 3/0412* (2013.01)

(58) Field of Classification Search
CPC ............. G06F 3/04166; G06F 3/04886; G06F 3/0412; G06F 3/04184
See application file for complete search history.

(56) References Cited

U.S. PATENT DOCUMENTS

| | | | | |
|---|---|---|---|---|
| 10,262,580 B2 | 4/2019 | Chang | | |
| 10,497,334 B2 | 12/2019 | So et al. | | |
| 2015/0054754 A1* | 2/2015 | Han | ...................... | G06F 3/0446 345/173 |
| 2021/0318771 A1* | 10/2021 | Lee | ...................... | G09G 3/3677 |
| 2021/0384179 A1* | 12/2021 | Bok | ...................... | H10K 59/65 |

FOREIGN PATENT DOCUMENTS

| | | |
|---|---|---|
| KR | 100692675 B1 | 3/2007 |
| KR | 101693088 B1 | 1/2017 |
| KR | 20230075010 A | 5/2023 |
| KR | 102539856 B1 | 6/2023 |

* cited by examiner

*Primary Examiner* — Yaron Cohen
(74) *Attorney, Agent, or Firm* — Seed Intellectual Property Law Group LLP

(57) ABSTRACT

The present embodiment relates to a display device and a method for driving the display device, and more particularly, to a display device and a method for driving the display device, which may display a portion of a unit frame image on one area of a display panel, and sense a user's touch input on the remaining area of the display panel as well.

16 Claims, 19 Drawing Sheets

DISPLAY DEVICE HAVING MUTIPLE DISPLAY AREAS AND METHOD FOR DRIVING THE SAME

CROSS-REFERENCE TO RELATED APPLICATION

This application claims priority to and the benefit of Korean Patent Application No. 10-2023-0196746, filed on Dec. 29, 2023, the disclosure of which is incorporated herein by reference in its entirety.

BACKGROUND

Technical Field

The present disclosure relates to a display device and a method for driving the same.

Description of the Related Art

A user interface may enable a user to easily control various kinds of electronic devices by enabling the user and the electronic devices to communicate with each other. User interface technology is advancing over and over again in a direction of increasing user sensitivity and convenience of operation, and has recently been developed into a touch UI, voice UI, 3D (Dimensions) UI, and the like.

Among them, the touch UI senses a user's touch input by implementing a touch screen on a display panel.

The touch UI has been adopted in a portable information device such as a smart phone, and has been extensively applied to a notebook computer, a computer monitor, a refrigerator, and the like.

In a display device to which the above-described touch UI is applied, a unit frame period for displaying a unit frame video may be divided into a display driving period and a touch driving period.

In other words, the display device displays one frame of a video in the display driving period of the unit frame period, and then senses a user's touch input in the touch driving period that is the remaining period.

A display device in which the unit frame period is divided into the display driving period and the touch driving period may have a shorter time for displaying the unit frame video than that of the display device to which the touch UI is not applied.

BRIEF SUMMARY

The present disclosure provides a display device and a method for driving the display device, which may display a part of a unit frame image on one area of a display panel, and sense a user's touch input on the remaining area of the display panel as well.

Technical features of the present disclosure are not limited to the above-described features, and other unmentioned features or characteristics will be clearly understood by those skilled in the art from the following description.

The present embodiment provides a method for driving a display device, which includes the steps of: sensing a touch input on a second display area while first pixel data is written on first pixels in a first display area; and sensing a touch input on the first display area while second pixel data is written on second pixels in the second display area.

In the step of sensing the touch input on the second display area, the display device may be configured to apply a first data voltage corresponding to the first pixel data to first data lines in the first display area.

The display device may be configured to apply a first noise compensation voltage having a phase opposite to a phase of the first data voltage to second data lines in the second display area, and to compensate for a noise component that is generated in the second display area by the first data voltage when the first pixel data is written on the first pixels.

The first data lines and the second data lines may be physically separated from each other, and the first noise compensation voltage may not be transferred to the first data lines.

In the step of sensing the touch input on the first display area, the display device may be configured to apply a second data voltage corresponding to the second pixel data to second data lines in the second display area.

The display device may be configured to apply a second noise compensation voltage having a phase opposite to a phase of the second data voltage to first data lines in the first display area, and to compensate for a noise component that is generated in the first display area by the second data voltage when the second pixel data is written on the second pixels.

The display device may be configured to electrically connect the second data lines and the second pixels to each other, and to electrically separate the first data lines and the first pixels from each other.

In another aspect, the present embodiment provides a display device, which includes: a display panel including a first display area in which a plurality of first pixels are disposed and a second display area in which a plurality of second pixels being electrically separated from the first pixels are disposed; a first display area driver configured to write first pixel data on first pixels in the first display area; a second display area driver configured to write second pixel data on second pixels in the second display area; first touch sensors disposed on the first display area; second touch sensors disposed on the second display area; and a touch sensor driver configured to sense a touch input on the second display area by driving the second touch sensors while the first pixel data is written on the first pixels, and to sense a touch input on the first display area by driving the first touch sensors while the second pixel data is written on the second pixels.

The first display area driver may include: a first gate driving circuit configured to output a gate signal to the first display area; and a first data driving circuit configured to output a first data voltage corresponding to the first pixel data to first data lines disposed in the first display area, and the second display area driver may include: a second gate driving circuit configured to output a gate signal to the second display area; and a second data driving circuit configured to output a second data voltage corresponding to the second pixel data to second data lines disposed in the second display area.

When the touch sensor driver drives the second touch sensors, the second gate driving circuit may be configured not to output the gate signal to the second display area, and the second data driving circuit may be configured to output a first noise compensation voltage having a phase opposite to a phase of the first data voltage to the second data lines, and to compensate for a noise component that is generated in the second touch sensors by the first data voltage.

The first data lines and the second data lines may be physically separated from each other, and the first noise compensation voltage may not be transferred to the first data lines.

When the touch sensor driver drives the first touch sensors, the first gate driving circuit may be configured not to output the gate signal to the first display area, and the first data driving circuit may be configured to output a second noise compensation voltage having a phase opposite to a phase of the second data voltage to the first data lines, and to compensate for a noise component that is generated in the first touch sensors by the second data voltage.

The touch sensor driver may include: a first touch driving circuit configured to drive the first touch sensors while the second pixel data is written on the second pixels; and a second touch driving circuit configured to drive the second touch sensors while the first pixel data is written on the first pixels.

A portion of a first period in which the first pixel data is written on the first pixels and a portion of a second period in which the second pixel data is written on the second pixels may overlap each other.

The second touch driving circuit may be configured to drive the second touch sensors in a period that does not overlap the second period in the first period, and not to drive the second touch sensors in a period that overlaps the second period.

The first touch driving circuit may be configured not to drive the first touch sensors in a period that overlaps the first period in the second period, and to drive the first touch sensors in a period that does not overlap the first period.

As described above, according to the present disclosure, since the display device may display a portion of a unit frame image in one area of the display panel in one period of the unit frame period, and sense a user's touch input in the remaining area of the display panel as well, and may display the remainder of the unit frame image in the remaining area of the display panel in the remaining period of the unit frame period, and sense the user's touch input in the one area of the display panel as well, it is possible to sufficiently secure time for displaying the unit frame image in the unit frame period and time for sensing the user's touch input, and due to this, high-speed driving of the display device becomes possible.

Various useful advantages and effects of the embodiments are not limited to the above-described contents and will be more easily understood from descriptions of the specific embodiments.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
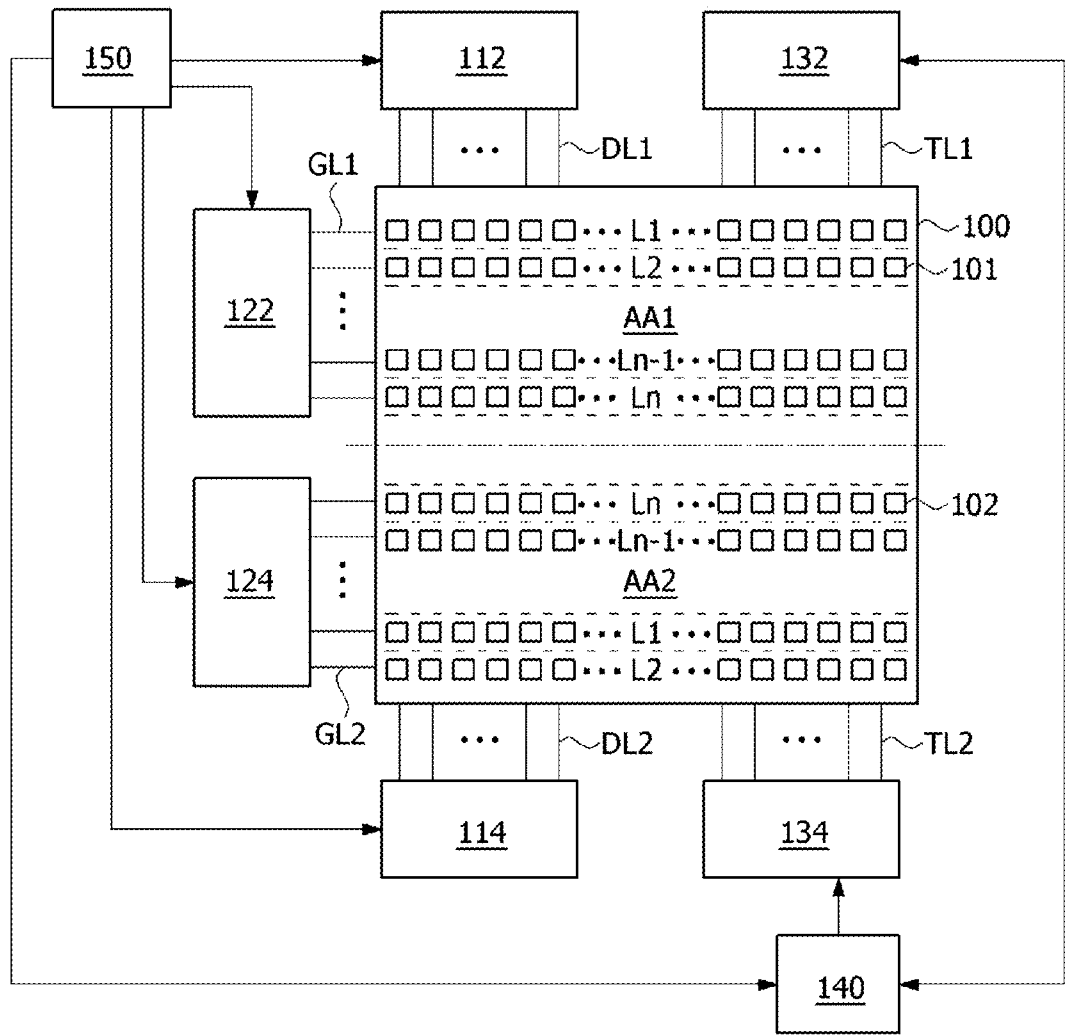
FIG. 1 is a block diagram showing a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

Shapes, sizes, ratios, angles, numbers, and the like disclosed in the drawings for describing the embodiments of the present disclosure are exemplary, and the present disclosure is not limited to the illustrated items. Like reference numerals refer to like elements throughout. In addition, in describing the present disclosure, if it is determined that the detailed description of the related known technology may unnecessarily obscure the subject matter of the present disclosure, the detailed description thereof will be omitted.

The terms such as “comprising,” “including,” “having,” and “consist of” used herein are generally intended to allow other components to be added unless the terms are used with the term "only." Any references to singular may include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple," "crossing or intersecting," and the like, one or more other parts may be interposed therebetween unless the term "immediately" or "directly" is used in the expression.

The terms "first," "second," and the like may be used to distinguish components from each other, but the functions or structures of the components are not limited by ordinal numbers or component names in front of the components. The ordinal numbers preceding the component names in the claims may not match the ordinal numbers preceding the component names in the embodiments.

The following embodiments can be partially or entirely bonded to or combined with each other and can be linked and operated in technically various ways. The embodiments can be carried out independently of or in association with each other.

In a display device of the present disclosure, a display panel driver, a pixel circuit, a level shifter, and the like may include transistors. The transistors may be implemented by oxide transistors including oxide semiconductor, low temperature poly silicon (LTPS) transistors including LTPS, and the like. Here, the transistor may be a thin film transistor (TFT).

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons may flow from the source to the drain. In the N-channel transistor, the direction of current flows from the drain to the source. In the case of a P-channel transistor, since the carrier is a hole, the source voltage is higher than the drain voltage so that the hole may flow from the source to the drain. In the P-channel transistor, current flows from the source to the drain because the hole flows from the source to the drain. It should be noted that the source and drain of the transistor are not fixed. For example, the source and drain may be changed according to the applied voltage. Therefore, the disclosure is not limited due to the source and drain of the transistor. In the following description, a drain and a source of a transistor is called a first electrode and a second electrode.

The scan signal swings between a gate-on voltage and a gate-off voltage. The gate-off voltage may be interpreted as a first voltage, and the gate-on voltage may be interpreted as a second voltage. The transistor is turned on in response to the gate-on voltage, while the transistor is turned off in response to the gate-off voltage. In the case of an N-channel transistor, the gate-on voltage may be a gate high voltage (VGH), and the gate-off voltage may be a gate low voltage (VGL). In the case of a P-channel transistor, the gate-on voltage may be the gate low voltage (VGL), and the gate-off voltage may be the gate high voltage (VGH).

Hereinafter, various embodiments of the present disclosure will be described in detail with reference to the accompanying drawings.

FIG. 1 is a block diagram showing a display device according to an embodiment of the present disclosure.

A display device according to an embodiment of the present disclosure may sense a user's touch input on a second display area while first pixel data is written on first pixels in a first display area.

Further, the display device may sense a user's touch input on the first display area while second pixel data is written on second pixels in the second display area.

For this, the display device includes a display panel 100, and a display panel driver for writing pixel data on pixels in the display panel 100.

A substrate of the display panel 100 may be a plastic substrate, a thin glass substrate, or a metal substrate, but is not limited thereto. The display panel 100 may be a panel of a rectangular structure having a length in X-axis direction (or first direction), a width in Y-axis direction (or second direction), and a thickness in Z-axis direction (or third direction), but is not limited thereto. For example, at least a portion of the display panel 100 may have a curved outer part.

The display panel 100 may be implemented as a non-transmission type display panel or a transmission type display panel. Here, the transmission type display panel may be applied to a transparent display device in which an image is displayed on a screen and a real thing beyond the display panel 100 is shown.

The display panel 100 may be produced as a flexible display panel. Further, the display panel 100 may be produced as a stretchable panel.

A display area of the display panel 100 may be divided into a first display area AA1 and a second display area AA2.

In the first display area AA1, first data lines DL1 and first gate lines GL1 crossing the first data lines DL1 are disposed, and first pixels 101 are disposed in a matrix form.

Further, in the second display area AA2, second data lines DL2 and second gate lines GL2 crossing the second data lines DL2 are disposed, and second pixels 102 are disposed in a matrix form.

The display panel 100 may further include low-voltage power wires (e.g., ground wires) commonly connected to the first pixels 101 in the first display area AA1 and the second pixels 102 in the second display area AA2. The low-voltage power wires are commonly connected to the first pixels 101 in the first display area AA1 and the second pixels 102 in the second display area AA2, and supply, to the first pixels 101 and the second pixels 102, a cathode voltage ELVSS that is one of constant voltages required to drive the pixels 101 and 102. The low-voltage power wires may be implemented as long stripe wires extended along a first direction or a second direction on the first display area AA1 and the second display area AA2, or may be implemented as mesh wires in which the wires in the first direction and the wires in the second direction are electrically connected. In some cases, the low-voltage power wires may be implemented in a thin film form that is the same as or similar to areas of the first display area AA1 and the second display area AA2.

The first pixels 101 in the first display area AA1 and the second pixels 102 in the second display area AA2 may include liquid crystal cells including liquid crystal molecules or light-emitting elements. For color implementation, each of the first pixels 101 and the second pixels 102 may be divided into a red sub-pixel, a green sub-pixel, and a blue sub-pixel. Each of the pixels may further include a white sub-pixel. Each of the sub-pixels includes a pixel circuit for driving the light-emitting element. Each of the pixel circuits may be connected to data lines, gate lines, and power wires. Hereinafter, a "pixel" may be interpreted as a "sub-pixel."

Each of the first display area AA1 and the second display area AA2 includes a plurality of pixel lines L1 to Ln. Each of the pixel lines L1 to Ln includes 1 line of pixels disposed along a line direction (Z-axis direction) in each of the first display area AA1 and the second display area AA2 of the display panel 100. The first pixels 101 disposed on 1 pixel line in the first display area AA1 share the first gate lines GL1. Further, the second pixels 102 disposed on 1 pixel line in the second display area AA2 share the second gate lines GL2.

The sub-pixels disposed in a column direction (Y) along a data line direction in the first display area AA1 share the same data line DL1. Here, 1 horizontal period is a time period obtained by dividing a unit frame period by the total number of pixel lines L1 to Ln.

The display panel driver writes pixel data of an input image in pixel circuits of the display panel 100 under the control of a timing controller 150.

The display panel driver includes a first display area driver for driving the first display area AA1. Further, the display panel driver includes a second display area driver for driving the second display area AA2.

In other words, the display panel driver includes the first display area driver that writes first pixel data on the first pixels 101 in the first display area AA1 and the second display area driver that writes second pixel data on the second pixels 102 in the second display area AA2.

Here, the first display area driver may include a first data driving circuit 112 and a first gate driving circuit 122. Further, the second display area driver may include a second data driving circuit 114 and a second gate driving circuit 124.

Meanwhile, in the present disclosure, first touch sensors may be disposed on the first display area AA1 of the display panel 100. Further, second touch sensors may be disposed on the second display area AA2.

In other words, the first touch sensors may be disposed on a first touch area (TA1 of FIG. 4) corresponding to the first display area AA1, and the second touch sensors may be disposed on a second touch area (TA2 of FIG. 4) corresponding to the second display area AA2.

In this case, the display panel driver may include a touch sensor driver configured to drive the first touch sensors and the second touch sensors.

Here, while the first pixel data is written on the first pixels 101 by the first display area driver, the touch sensor driver may drive the second touch sensors to sense a touch input on the second display area AA2.

Further, while the second pixel data is written on the second pixels 102 by the second display area driver, the touch sensor driver may drive the first touch sensors to sense a touch input on the first display area AA1.

The touch sensor driver as described above may include a first touch driving circuit 132 configured to drive the first touch sensors while the second pixel data is written on the second pixels 102, a second touch driving circuit 134 configured to drive the second touch sensors while the first pixel data is written on the first pixels 101, and a touch controller 140 configured to control the driving of the first touch driving circuit 132 and the second touch driving circuit 134.

The first data driving circuit 112 and the first touch driving circuit 132 may be integrated into one drive integrated circuit (IC). Further, the second data driving circuit 114 and the second touch driving circuit 134 may also be integrated into one drive IC.

The first data driving circuit 112 may write, on the first pixels 101, the first pixel data corresponding to a first divided image that is displayed on the first display area AA1 among unit frame images.

In other words, the first data driving circuit 112 receives a first pixel data signal corresponding to the first pixel data from the timing controller 150, and converts the first pixel data signal into a first data voltage to apply the converted first data voltage to the first data lines DL1.

The second data driving circuit 114 may write, on the second pixels 102, the second pixel data corresponding to a second divided image that is displayed on the second display area AA2 among the unit frame images.

In other words, the second data driving circuit 114 receives a second pixel data signal corresponding to the second pixel data from the timing controller 150, and converts the second pixel data signal into a second data voltage to apply the converted second data voltage to the second data lines DL2.

Figure 3:
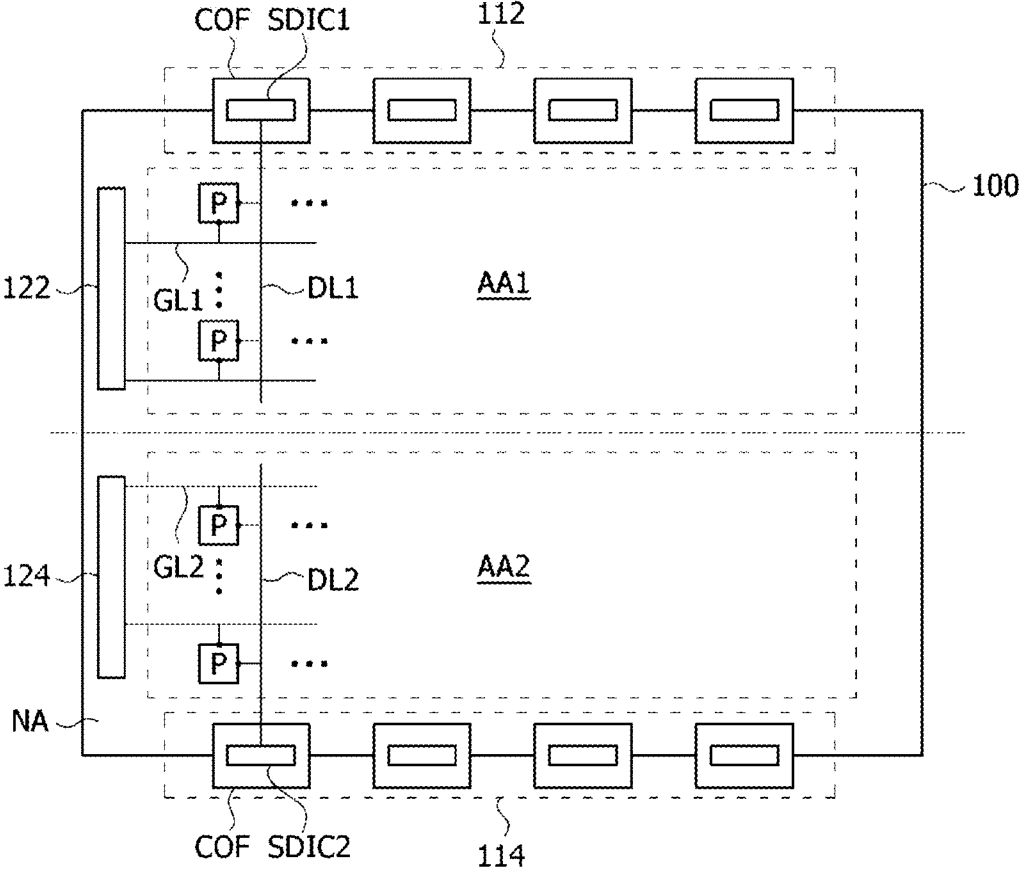
FIG. 3 is a diagram explaining configurations of a data driving circuit and data lines in a display device illustrated in FIG. 1.

The second data driving circuit 114 as described above may be implemented as one or more second source driver ICs SDIC2 as in FIG. 3. Further, the first data driving circuit 112 may also be implemented as one or more first source driver ICs SDIC1. The first source driver IC SDIC1 and the second source driver IC SDIC2 may be connected to a bonding pad of the display panel 100 in a tape automated bonding (TAB) method or a chip on glass (COG) method. Further, the first source driver IC SDIC1 and the second source driver IC SDIC2 may be implemented as a chip on film (COF) that is mounted on a film as in FIG. 3.

In an embodiment of the present disclosure, the first data lines DL1 connected to the first data driving circuit 112 and the second data lines DL2 connected to the second data driving circuit 114 are separated from each other. In other words, the first data lines DL1 and the second data lines DL2 are physically separated from each other. Further, they are also electrically separated from each other.

Accordingly, the first data voltage that the first data driving circuit 112 outputs to the first data lines DL1 is not transferred to the second data lines DL2. Further, the second data voltage that the second data driving circuit 114 outputs to the second data lines DL2 is not transferred to the first data lines DL1.

The first gate driving circuit 122 and the second gate driving circuit 124 may be disposed on a non-display area of the display panel 100.

The first gate driving circuit 122 may be disposed on one non-display area NA that is located on the left or right side of the first display areas AA1 as in FIG. 3, and may supply gate signals to the first gate lines GL1 in a single feeding method.

The first gate driving circuit 122 may be disposed on both non-display areas located on the left and right sides of the first display area AA1, and may supply gate signals on both sides of the first gate lines GL1 in a double feeding method. Here, the first gate driving circuit 122 may be activated through reception of a first start pulse VST1 from the timing controller 150. In this state, the first gate driving circuit 122 may sequentially output the gate signals to the first gate lines GL1.

The second gate driving circuit 124 may be disposed on one non-display area that is located on the left or right side of the second display areas AA2 as in FIG. 3, and may supply gate signals to the second gate lines GL2 in a single feeding method.

The second gate driving circuit 124 may be disposed on both non-display areas located on the left and right sides of the second display area AA2, and may supply gate signals on both sides of the second gate lines GL2 in a double feeding method. Here, the second gate driving circuit 124 may be activated through reception of a second start pulse VST2 from the timing controller 150. In this state, the second gate driving circuit 124 may sequentially output the gate signals to the second gate lines GL2.

The first touch driving circuit 132 is connected to first touch wires TL1, and the second touch driving circuit 134 is connected to second touch wires TL2. The first touch wires TL1 are connected to the first touch sensors disposed in the first touch area TA1 of FIG. 4, and the second touch wires TL2 are connected to the second touch sensors disposed in the second touch area TA2 of FIG. 4.

The first touch wires TL1 and the second touch wires TL2 may include TX wires Tx through which driving signals for driving the touch sensors are applied and RX wires Rx through which touch sensing signals of the touch sensors are transmitted. Here, the touch sensors may be disposed on the display panel 100 in an on-cell type or add on type, or may be implemented in an in-cell type in which the touch sensors are built in the display panel 100. The touch sensors may be touch sensors using capacitance, for example, self-capacitance type touch sensors or mutual-capacitance type touch sensors, but are not limited thereto.

The first touch driving circuit 132 may be activated or deactivated by the touch controller 140. The first touch driving circuit 132 that is activated by the touch controller 140 applies the TX signals to the first touch sensors through the TX wires Tx of the first touch area TA1, and generates first touch raw data by converting the touch sensing signals of the first touch sensors, which are received from the RX wires Rx of the first touch area TA1, into digital data. Further, the first touch driving circuit 132 may output the first touch raw data to the touch controller 140.

The second touch driving circuit 134 may also be activated or deactivated by the touch controller 140. The second touch driving circuit 134 that is activated by the touch controller 140 applies the TX signals to the second touch sensors through the TX wires Tx of the second touch area TA2, and generates second touch raw data by converting the touch sensing signals of the second touch sensors, which are received from the RX wires Rx of the second touch area TA2, into digital data. Further, the second touch driving circuit 134 may output the second touch raw data to the touch controller 140.

The touch controller 140 may activate or deactivate the second touch driving circuit 134 by using a first touch synchronization signal TSYNC1 that is input from the timing controller 150. In other words, the touch controller 140 may activate or deactivate the second touch area TA2 by using the first touch synchronization signal TSYNC1.

Here, the touch controller 140 may activate the second touch area TA2 if the voltage level of the first touch synchronization signal TSYNC1 is a first voltage level LV1, and may deactivate the second touch area TA2 if the voltage level of the first touch synchronization signal TSYNC1 is a second voltage level LV2.

In other words, if the voltage level of the first touch synchronization signal TSYNC1 is the first voltage level LV1, the touch controller 140 may activate the second touch driving circuit 134, so that the second touch sensors of the second touch area TA2 may sense the user's touch input.

The touch controller 140 may activate or deactivate the first touch driving circuit 132 by using a second touch synchronization signal TSYNC2 that is input from the timing controller 150. In other words, the touch controller 140 may activate or deactivate the first touch area TA1 by using the second touch synchronization signal TSYNC2.

Here, the touch controller 140 may activate the first touch area TA1 if the voltage level of the second touch synchronization signal TSYNC2 is the first voltage level LV1, and may deactivate the first touch area TA1 if the voltage level of the second touch synchronization signal TSYNC2 is the second voltage level LV2.

In other words, if the voltage level of the second touch synchronization signal TSYNC2 is the first voltage level LV1, the touch controller 140 may activate the first touch driving circuit 132, so that the first touch sensors of the first touch area TA1 may sense the user's touch input.

Meanwhile, the touch controller 140 may receive the first touch raw data from the first touch driving circuit 132, and may compare the first touch raw data with a predetermined reference value.

The first touch raw data that is equal to or larger than the reference value may be output as logical values indicating the user's touch input. The touch controller 140 may transfer the first touch data including such logical values to a host system (not illustrated).

The touch controller 140 may receive the second touch raw data from the second touch driving circuit 134, and may compare the second touch raw data with a predetermined reference value.

The second touch raw data that is equal to or larger than the reference value may be output as logical values indicating the user's touch input. The touch controller 140 may transfer the second touch data including such logical values to the host system (not illustrated).

Figure 4:
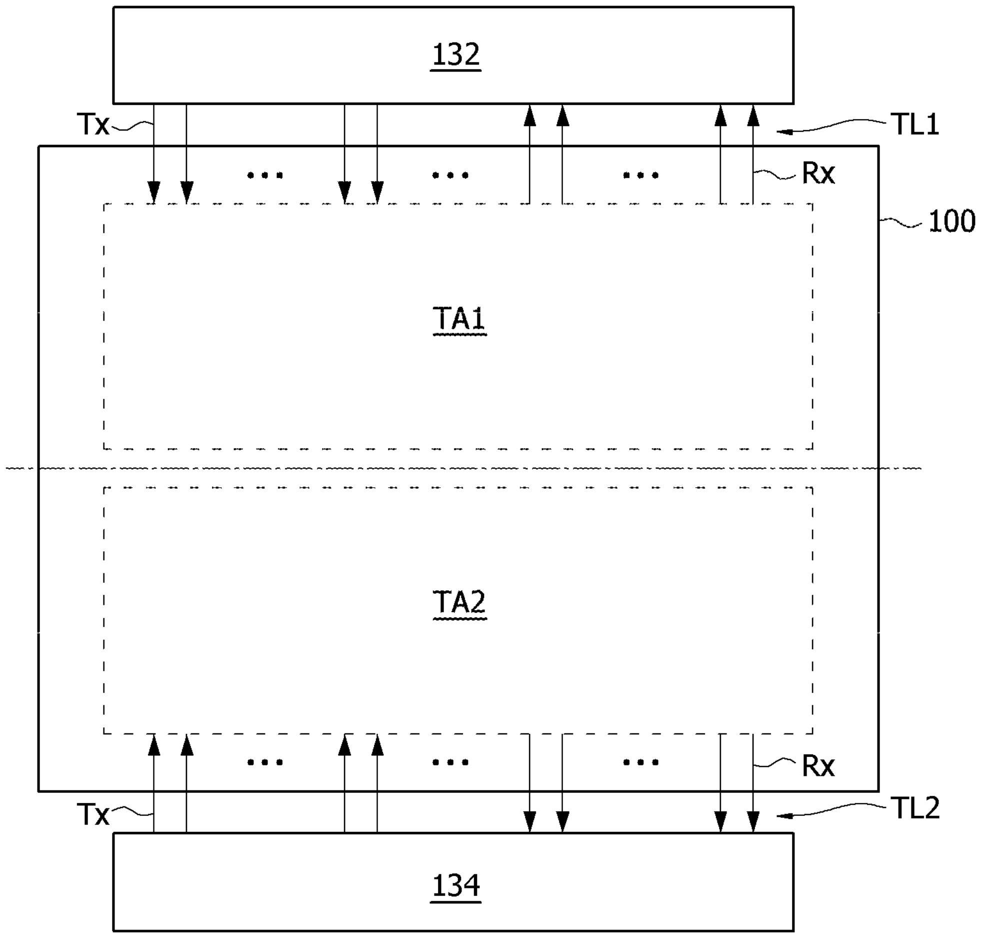
FIG. 4 is a diagram explaining the configuration of a touch driving circuit in a display device illustrated in FIG. 1.

In FIG. 4, although it is described that the touch area is divided into two touch areas on the display panel 100, the present disclosure is not limited thereto, and the touch area may be divided into four or more touch areas.

For example, the first touch area TA1 may be further divided into two touch areas, and the second touch area TA2 may be further divided into two touch areas, resulting in that the touch area may be divided into four touch areas on the display panel 100.

In this case, since the touch driving circuit should be disposed for each of four touch areas, the touch sensor driver may include four touch driving circuits.

Although the touch area is divided into four or more touch areas on the display panel 100 as described above, the areas of the first touch area TA1 and the second touch area TA2 may be equal to or similar to the areas of the first display area AA1 and the second display area AA2.

The timing controller 150 receives video data and a timing signal that is synchronized with the video data from the host system (not illustrated). The video data received by the timing controller 130 is a digital signal. The video data that is received in the timing controller 150 is a digital signal. The timing controller 150 may convert the video data to suit a data format that is used in the first data driving circuit 112 and the second data driving circuit 114, and may output the converted video data to the first data driving circuit 112 and the second data driving circuit 114. Here, the timing signal may include a vertical synchronization signal, a horizontal synchronization signal, a data enable signal, and the like.

Figure 2:
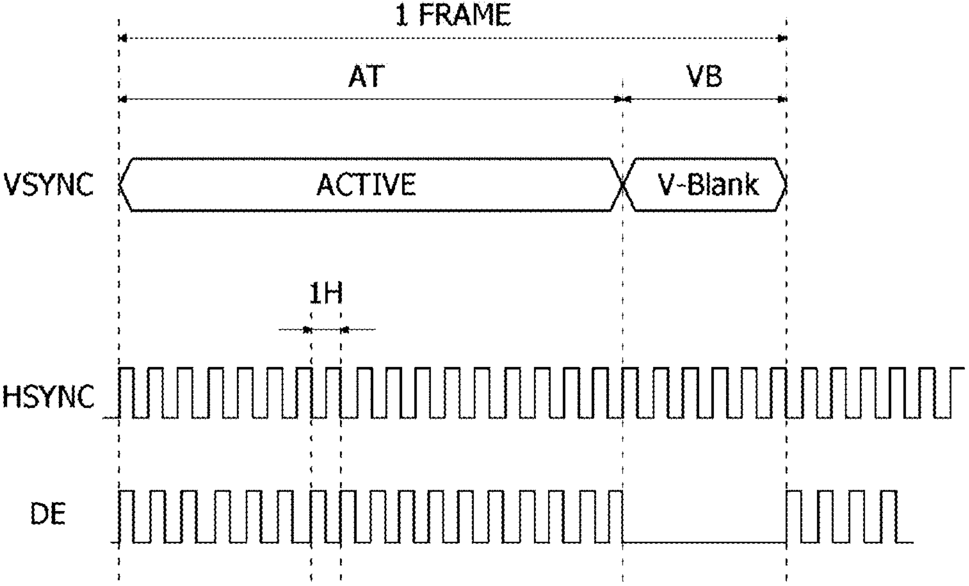
FIG. 2 is a diagram showing a unit frame period and one horizontal period.

Referring to FIG. 2, the vertical synchronization signal VSYNC defines one frame period, that is, a unit frame period. Here, the vertical synchronization signal VSYNC includes an active period AT and a vertical blank period VB.

The horizontal synchronization signal HSYNC defines one horizontal period (1H). The data enable signal DE defines a valid data interval including pixel data to be written on pixels. Pulses of the data enable signal are synchronized with the pixel data to be written on the pixels of the display panel 100. One pulse period of the data enable signal DE is one horizontal period (1H).

Since a vertical period and a horizontal period may be known through a method for counting the data enable signal, the vertical synchronization signal and the horizontal synchronization signal may be omitted.

The timing controller 150 may control the operation timing of the first data driving circuit 112 and the second data driving circuit 114 based on a timing signal received from the host system (not illustrated).

Further, the timing controller 150 may control the operation timing of the first gate driving circuit 122 and the second gate driving circuit 124 based on the timing signal.

Further, the timing controller 150 may control the operation timing of the first touch driving circuit 132 and the second touch driving circuit 134 based on the timing signal.

In an embodiment of the present disclosure, the timing controller 150 may distinguish unit frame periods by using the vertical synchronization signal VSYNC received from the host system (not illustrated).

The timing controller 150 may control the operation timing of the first data driving circuit 112, the second data driving circuit 114, the first gate driving circuit 122, and the second gate driving circuit 124 for each sub-period by subdividing the unit frame period into two sub-periods.

In other words, the timing controller 150 may determine whether to display images of the first display area AA1 and the second display area AA2 for each sub-period. For this, the timing controller 150 may divide the unit frame image that is displayed on the display panel 100 in the unit frame period into a first divided image and a second divided image.

Further, the timing controller 150 may determine whether to activate the first touch area TA1 and the second touch area TA2 for each sub-period.

Figure 5:
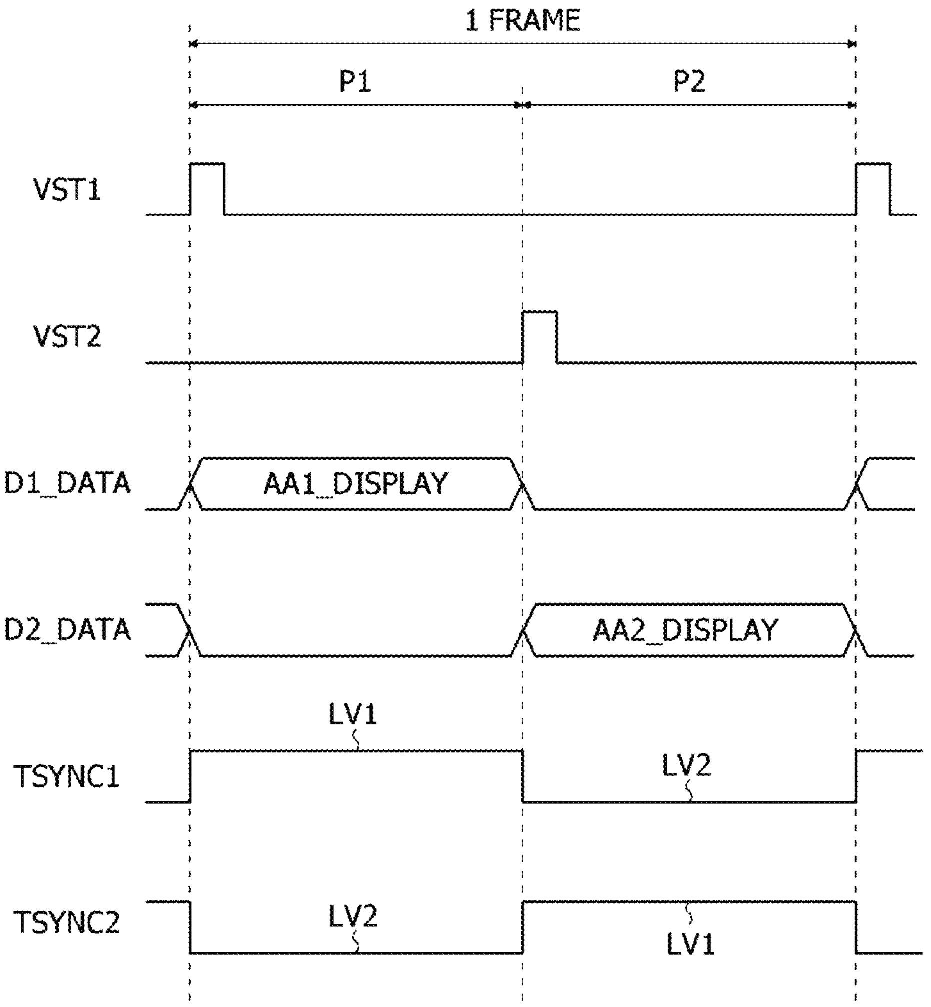
FIGS. 5 and 6 are waveform diagrams showing waveforms of signals which a timing controller according to an embodiment of the present disclosure outputs according to a first embodiment.

For example, the timing controller 150 may subdivide the unit frame period (1 FRAME) into a first sub-period P1 and a second sub-period P2 as in FIG. 5, activate the first gate driving circuit 122 in the first sub-period P1, and output a first pixel data signal AA1_DISPLAY corresponding to the first divided image to the first data driving circuit 112. Here, the timing controller 150 may activate the first gate driving circuit 122 through outputting of the first start pulse VST1 to the first gate driving circuit 122.

The first data driving circuit 112 having received the first pixel data signal AA1_DISPLAY may convert the first pixel data signal AA1_DISPLAY into a first data voltage, and may apply the converted first data voltage to the first data lines DL1. In other words, the first pixel data may be written on the first pixels 101.

Accordingly, the first divided image may be displayed on the first display area AA1 in the first sub-period P1.

Meanwhile, in the first sub-period P1, the timing controller 150 may output the first touch synchronization signal TSYNC1 for driving the second touch sensors of the second touch area TA2 to the touch controller 140. In other words, in the first sub-period P1, the timing controller 150 may output the voltage level of the first touch synchronization signal TSYNC1 as a first voltage level LV1.

Here, the second touch area TA2 is a touch area corresponding to the second display area AA2 on which the image is not displayed in the first sub-period P1.

The touch controller 140 may activate the second touch driving circuit 134 through the first touch synchronization signal TSYNC1 of the first voltage level LV1.

In the first sub-period P1, the timing controller 150 may deactivate the second gate driving circuit 124 by not outputting the second gate start pulse VST2.

Further, the first touch area TA1 corresponding to the first display area AA1 on which the first divided image is displayed may also be deactivated. Here, the timing controller 150 may deactivate the first touch area TA1 by configuring the voltage level of the second touch synchronization signal TSYNC2 that is output to the touch controller 140 to the second voltage level LV2.

As described above, in the first sub-period P1 of the unit frame period, the timing controller 150 may control to display the first divided image on the first display area AA1, and may control to sense the user's touch input on the second touch area TA2 corresponding to the second display area AA2.

Here, the frame frequency of the first display area AA1 may be higher than the frame frequency of the display panel 100.

For example, in case that the frame frequency of the display panel 100 is 120 Hz, and the first sub-period P1 is half the unit frame period, the frame frequency of the first display area AA1 may be 240 Hz.

In the second sub-period P2, the timing controller 150 may activate the second gate driving circuit 124, and may output a second pixel data signal AA2_DISPLAY corresponding to the second divided image to the second data driving circuit 114. Here, the timing controller 150 may activate the second gate driving circuit 124 by outputting the second start pulse VST2 to the second gate driving circuit 124.

The second data driving circuit 114 having received the second pixel data signal AA2_DISPLAY may convert the second pixel data signal AA2_DISPLAY into the second data voltage, and may apply the converted second data voltage to the second data lines DL2. In other words, the second pixel data may be written on the second pixels 102.

Accordingly, in the second sub-period P2, the second divided image may be displayed on the second display area AA2.

Meanwhile, in the second sub-period P2, the timing controller 150 may output the second touch synchronization signal TSYNC2 for driving the first touch sensors of the first touch area TA1 to the touch controller 140. In other words, in the second sub-period P2, the timing controller 150 may output the voltage level of the second touch synchronization signal TSYNC2 as the first voltage level LV1.

Here, the first touch area TA1 is a touch area corresponding to the first display area AA1 on which the image is not displayed in the second sub-period P2.

The touch controller 140 may activate the first touch driving circuit 132 through the second touch synchronization signal TSYNC2 of the first voltage level LV1.

In the second sub-period P2, the timing controller 150 may deactivate the first gate driving circuit 122 by not outputting the first gate start pulse VST1.

Further, the second touch area TA2 corresponding to the second display area AA2 on which the second divided image is displayed may also be deactivated. Here, the timing controller 150 may deactivate the second touch area TA2 by configuring the voltage level of the first touch synchronization signal TSYNC1 that is output to the touch controller 140 to the second voltage level LV2.

As described above, in the first sub-period P1 of the unit frame period, the timing controller 150 may control to display the second divided image on the second display area AA2, and may control to sense the user's touch input on the first touch area TA1 corresponding to the first display area AA1.

Here, the frame frequency of the second display area AA2 may be higher than the frame frequency of the display panel 100.

For example, in case that the frame frequency of the display panel 100 is 120 Hz, and the second sub-period P2 is half the unit frame period, the frame frequency of the second display area AA2 may be 240 Hz.

As described above, since the display area and the touch area of the display panel 100 are divided into two or more areas, and the timing controller 150 makes the display area and the touch area operate dividedly without overlapping each other for each sub-period by subdividing the unit frame period into sub-periods, it is not required to divide the unit frame period into the display driving period and the touch driving period.

For example, in case that the unit frame period is 8.4 milliseconds (ms) when the frame frequency of the display panel 100 is 120 Hz, the unit frame period may be divided into the display driving period and the touch driving period, so that the display driving period may be 5.3 ms, and the touch driving period may be 3 ms. In other words, the time for displaying the unit frame image on the display panel 100 may be 5.4 ms, and the time for sensing the user's touch input on the display panel 100 may be 3 ms.

In contrast, in case that the display area and the touch area of the display panel 100 are divided into two areas, and the timing controller 150 divides the unit frame period into halves, one sub-period becomes 4.2 ms.

Further, since two of the display area and the touch area operate in a divided manner without overlapping each other for each sub-period, the time for displaying the unit frame image on the display panel 100 may increase to 8.4 ms (4.2 ms for the first display area AA1, and 4.2 ms for the second display area AA2).

Further, the time for sensing the user's touch input on the first touch area TAL or the second touch area TA2 may increase to 4.2 ms.

Meanwhile, in an embodiment of the present disclosure, the low-voltage power wires (e.g., ground wires) may be commonly disposed in the first display area AA1 and the second display area AA2 of the display panel 100. In this case, when the first divided image is displayed on the first display area AA1 in the first sub-period P1, coupling may occur between the first data lines DL1 and the low-voltage power wires of the first display area AA1, and a first coupling voltage that is similar or equal to the first data voltage that is output to the first data lines DL1 may be transferred to the low-voltage power wires of the second display area AA2.

Here, since the second touch area TA2 corresponding to the second display area AA2 is in an activated state in the first sub-period P1, the first coupling voltage that is transferred to the low-voltage power wires of the second display area AA2 may act as a noise of the second touch area TA2, and may deteriorate accuracy of the touch sensing.

Even in the second sub-period P2, a second coupling voltage that is similar or equal to the second data voltage may act as a noise of the first touch area TA1, and may deteriorate the accuracy of the touch sensing.

Figure 6:
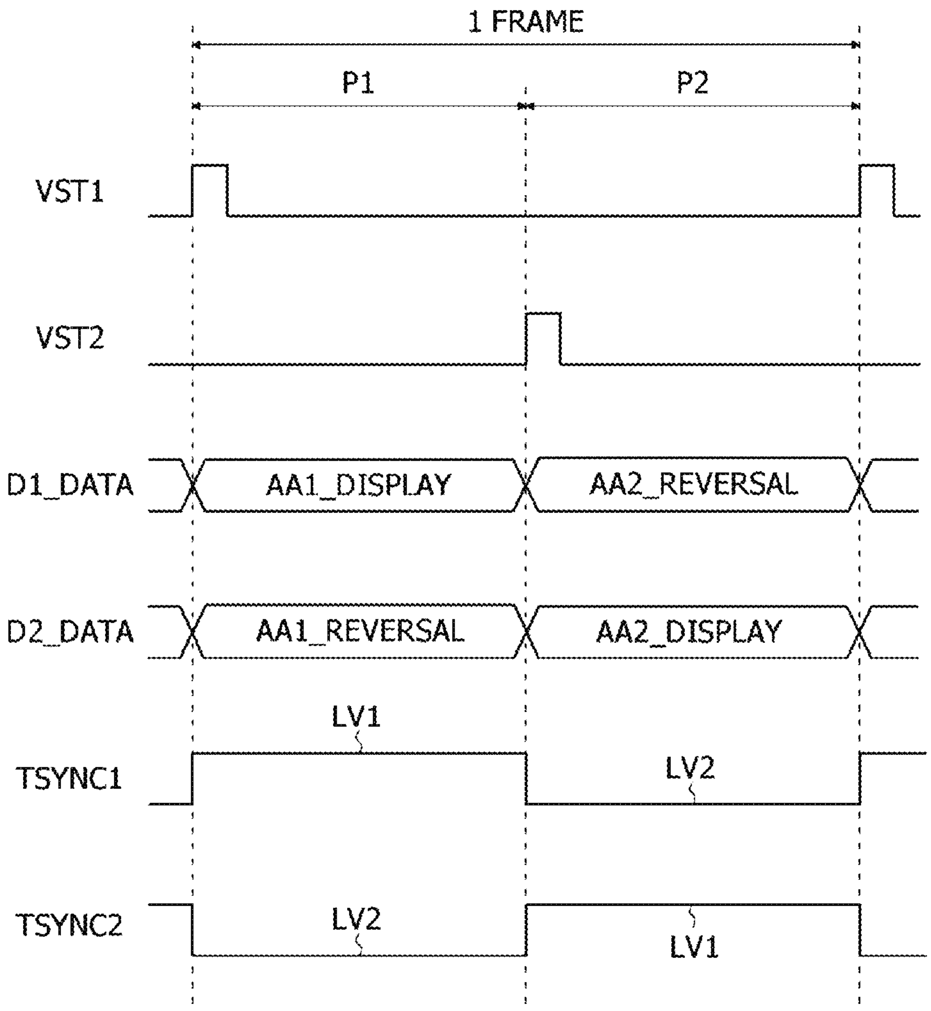

In order to compensate for the noise of the touch area, in a first embodiment, the timing controller 150 may output a first noise compensation signal AA1_REVERSAL as in FIG. 6 to the second data driving circuit 114 when the first divided image is displayed on the first display area AA1 in the first sub-period P1. Here, the timing controller 150 may deactivate the second gate driving circuit 124 when outputting the first noise compensation signal AA1_REVERSAL to the second data driving circuit 114.

In other words, the timing controller 150 may output the first noise compensation signal AA1_REVERSAL to the second data driving circuit 114 in a state where the second gate driving circuit 124 is deactivated.

Meanwhile, when the second divided image is displayed on the second display area AA2 in the second sub-period P2, the timing controller 150 may output a second noise compensation signal AA2_REVERSAL as in FIG. 6 to the first data driving circuit 112. Here, the timing controller 150 may deactivate the first gate driving circuit 122 when outputting the second noise compensation signal AA2_REVERSAL to the first data driving circuit 112.

In other words, the timing controller 150 may output the second noise compensation signal AA2_REVERSAL to the first data driving circuit 112 in a state where the first gate driving circuit 122 is deactivated.

Here, the first noise compensation signal AA1_REVERSAL is a signal having a phase opposite to the phase of the first pixel data signal AA1_DISPLAY, and the second noise compensation signal AA2_REVERSAL is a signal having a phase opposite to the phase of the second pixel data signal AA2_DISPLAY.

If the first noise compensation signal AA1_REVERSAL is output to the second data driving circuit 114 in the first sub-period P1, the second data driving circuit 114 may generate a first noise compensation voltage by using the first noise compensation signal AA1_REVERSAL. Here, since the phase of the first noise compensation signal AA1_REVERSAL is opposite to the phase of the first pixel data signal AA1_DISPLAY, the phase of the first noise compensation voltage also becomes opposite to the phase of the first data voltage.

The second data driving circuit 114 may apply the first noise compensation voltage having the phase opposite to the phase of the first data voltage as described above to the second data lines DL2. Here, since the second gate driving circuit 124 is in a deactivated state, and the gate signals are not output to the second display area AA2, the first noise compensation voltage is not transferred to the second pixels 102 connected to the second data lines DL2. Accordingly, the second pixels 102 connected to the second data lines DL2 do not emit light due to the first noise compensation voltage.

If the second noise compensation signal AA2_REVERSAL is output to the first data driving circuit 112 in the second sub-period P2, the first data driving circuit 112 may generate a second noise compensation voltage by using the second noise compensation signal AA2_REVERSAL. Here, since the phase of the second noise compensation signal AA2_REVERSAL is opposite to the phase of the second pixel data signal AA2_DISPLAY, the phase of the second noise compensation voltage also becomes opposite to the phase of the second data voltage.

The first data driving circuit 112 may apply the second noise compensation voltage having the phase opposite to the phase of the second data voltage as described above to the first data lines DL1. Here, since the first gate driving circuit 122 is in a deactivated state, and the gate signals are not output to the first display area AA1, the second noise compensation voltage is not transferred to the first pixels 101 connected to the first data lines DL1. Accordingly, the first pixels 101 connected to the first data lines DL1 do not emit light due to the second noise compensation voltage.

Meanwhile, in the first sub-period P1, the low-voltage power wires of the second display area AA2 may be in a state where the first coupling voltage that is similar or equal to the first data voltage is applied thereto. In this state, if the second data lines DL2 and the low-voltage power wires of the second display area AA2 are coupled to each other, the first coupling voltage may be offset by the first noise compensation voltage having the phase opposite to the phase of the first coupling voltage.

In the same manner, in the second sub-period P2, the low-voltage power wires of the first display area AA1 may be in a state where the second coupling voltage that is similar or equal to the second data voltage is applied thereto. In this state, if the first data lines DL1 and the low-voltage power wires of the first display area AA1 are coupled to each other, the second coupling voltage may be offset by the second noise compensation voltage having the phase opposite to the phase of the second coupling voltage.

Figure 7:
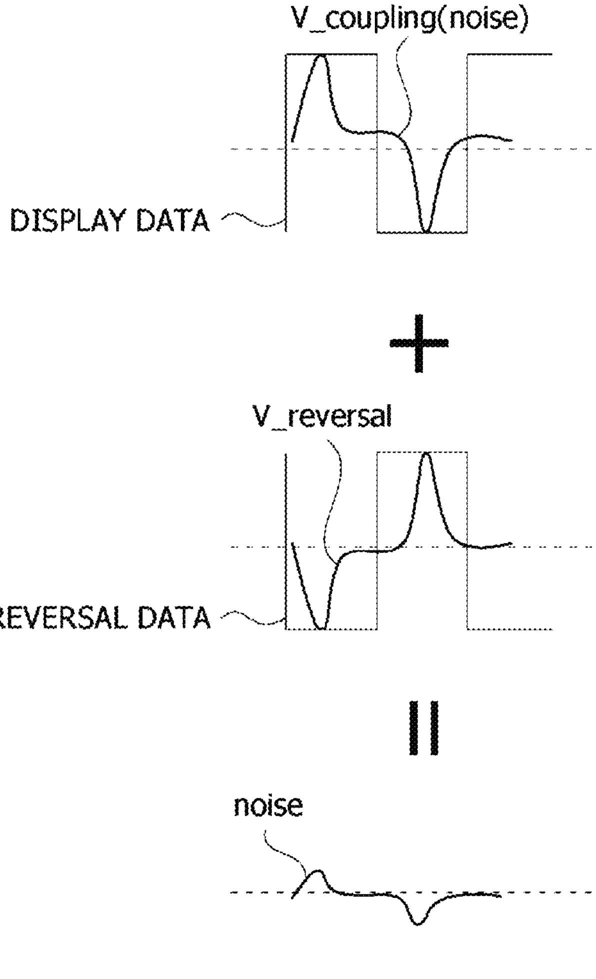
FIG. 7 is a diagram explaining a configuration that compensates for a noise being generated in a touch area in an embodiment of the present disclosure.

In other words, a destructive interference may occur between the coupling voltage V_coupling that is applied to the low-voltage power wires by a divided video data signal DISPLAY DATA and a noise compensation voltage V_reversal that is applied to the data lines by the noise compensation signal REVERSAL DATA as in FIG. 7, and thus the noise of the touch area may be compensated for.

Figure 8:
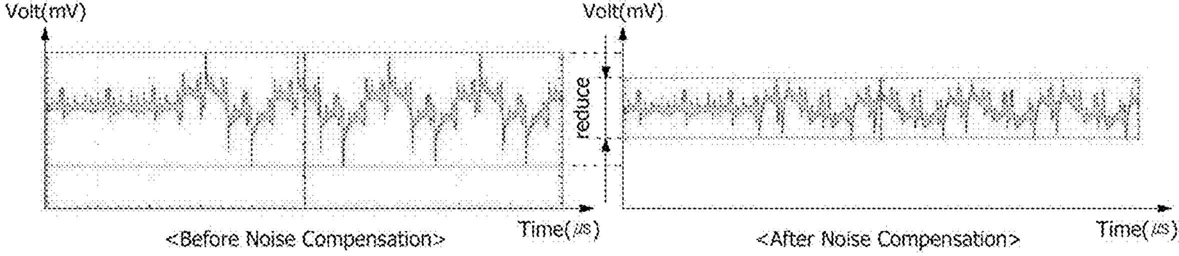
FIG. 8 is a diagram explaining a noise improvement effect of a first touch area in an embodiment of the present disclosure.

For example, if the noise of the second touch area TA2 is compensated for by the first noise compensation signal AA1_REVERSAL as in FIG. 8, the noise after the compensation may be reduced by 50% or more in comparison to the noise before the compensation. Here, the noise of the second touch area TA2 is a coupling voltage that is applied to the low-voltage power wires of the second touch area TA2, and waveforms of FIG. 8 are voltage waveforms obtained by measuring the coupling voltage that is applied to the low-voltage power wires of the second touch area TA2 for a predetermined time. In FIG. 8, the time unit is microsecond (μs), and the voltage unit is millivolt (mV).

Figure 9:
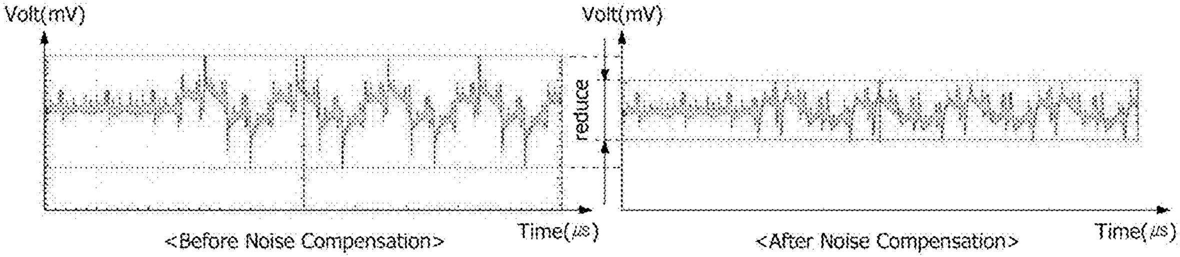
FIG. 9 is a diagram explaining a noise improvement effect of a second touch area in an embodiment of the present disclosure.

In the same manner, if the noise of the first touch area TA1 is compensated for by the second noise compensation signal AA2_REVERSAL as in FIG. 9, the noise after the compensation may be reduced by 50% or more in comparison to the noise before the compensation. Here, the noise of the first touch area TA1 is a coupling voltage that is applied to the low-voltage power wires of the first touch area TA1, and waveforms of FIG. 9 are voltage waveforms obtained by measuring the coupling voltage that is applied to the low-voltage power wires of the first touch area TA1 for a predetermined time. In FIG. 9, the time unit is μs, and the voltage unit is mV.

Figure 10:
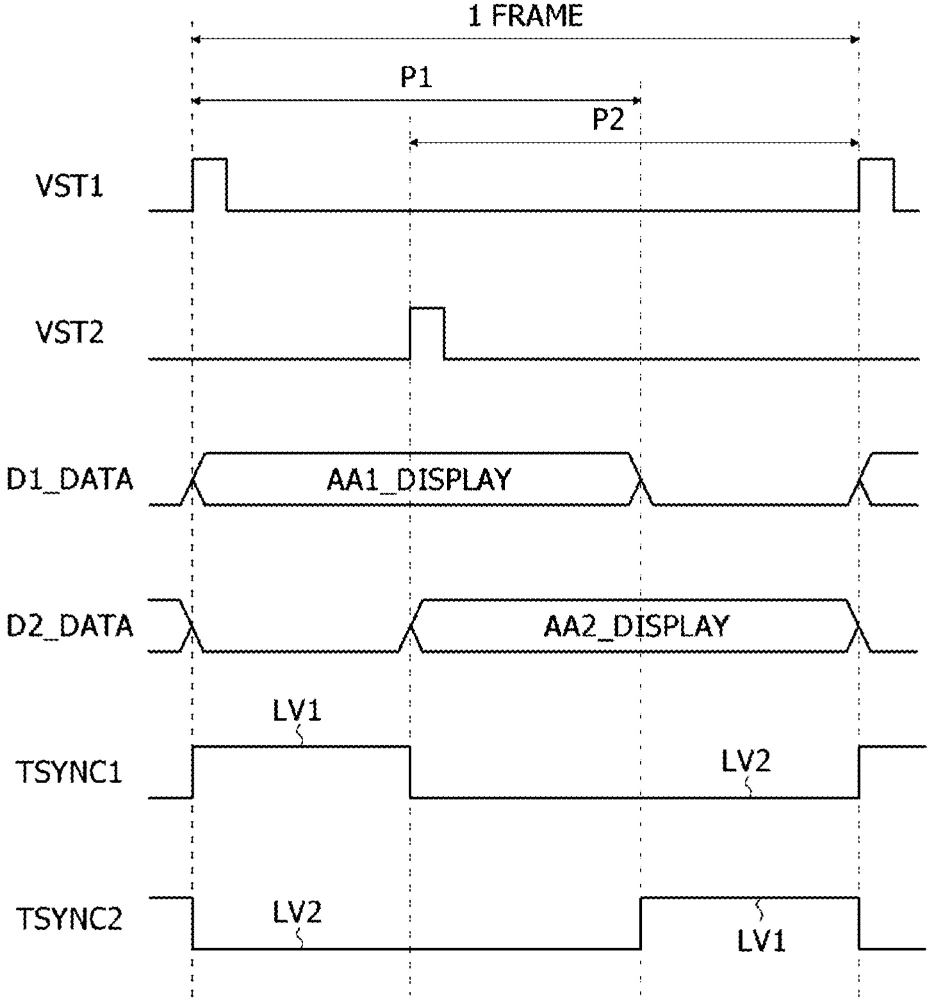
FIGS. 10 and 11 are waveform diagrams showing waveforms of signals which a timing controller according to an embodiment of the present disclosure outputs according to a second embodiment.
Figure 11:
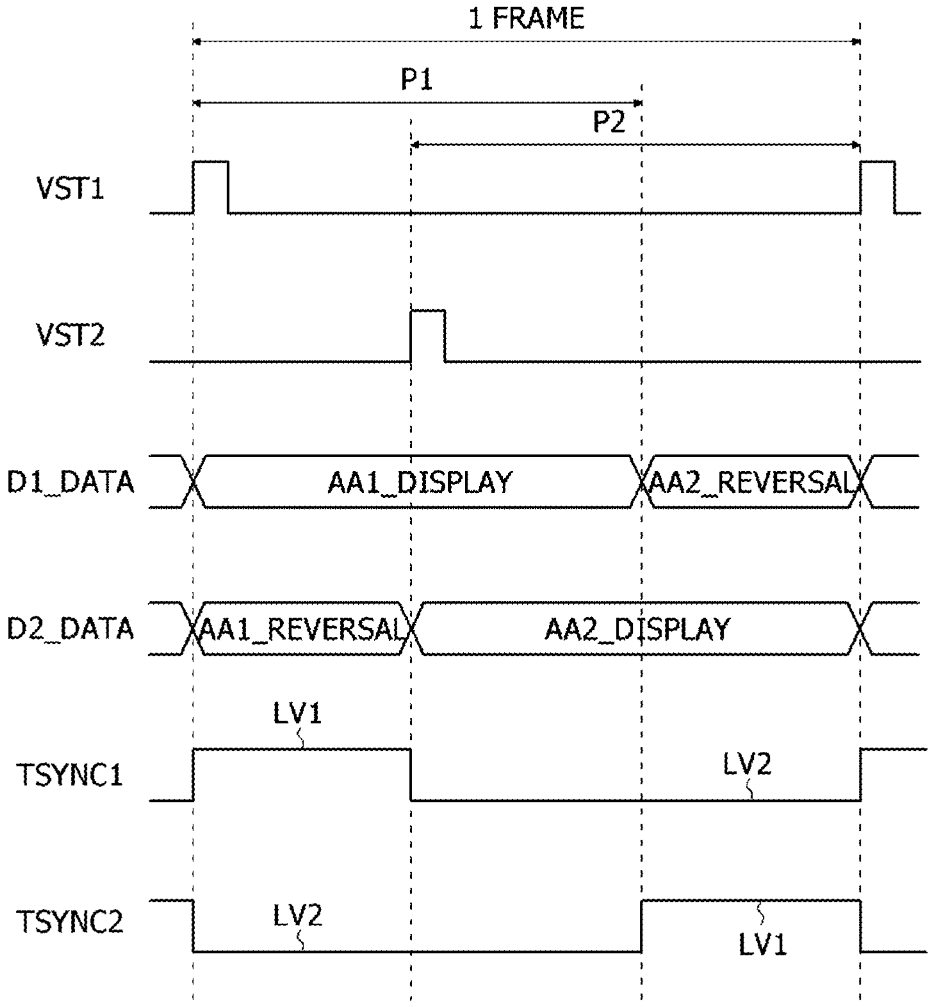

FIGS. 10 and 11 are waveform diagrams showing waveforms of signals which a timing controller according to an embodiment of the present disclosure outputs according to a second embodiment.

In the second embodiment, a portion of the first sub-period P1 in which the first pixel data is written on the first pixels and a portion of the second sub-period P2 in which the second pixel data is written on the second pixels may overlap each other.

Further, the second touch driving circuit 132 may drive the second touch sensors in a period that does not overlap the second sub-period P2 in the first sub-period P1, and may not drive the second touch sensors in a period that overlaps the second sub-period P2.

To do so, the timing controller 150 may subdivide the unit frame period (1 FRAME) into the first sub-period P1 and the second sub-period P2 in a manner that a portion of the first sub-period P1 and a portion of the second sub-period P2 overlap each other. In other words, in order to extend the first sub-period P1 and the second sub-period P2 within the unit frame period (1 FRAME), portions of the first sub-period P1 and the second sub-period P2 may overlap each other. For this, the second sub-period P2 may start before the first sub-period P1 is ended.

The timing controller 150 may activate the first gate driving circuit 122 by outputting the first start pulse VST1 to the first gate driving circuit 122 in the first sub-period P1.

Further, the timing controller 150 may output the first pixel data signal AA1_DISPLAY to the first data driving circuit 112 during the first sub-period P1.

The first data driving circuit 112 having received the first pixel data signal AA1_DISPLAY may convert the first pixel data signal AA1_DISPLAY into the first data voltage, and may apply the converted first data voltage to the first data lines DL1.

Accordingly, the first divided image may be displayed on the first display area AA1 during the first sub-period P1.

Meanwhile, the timing controller 150 may set the first touch synchronization signal TSYNC1 to the first voltage level LV1 in a period that does not overlap the second sub-period P2 in the first sub-period P1, and may output the set first voltage level LV1 to the touch controller 140. This allows the second touch area TA2 to be activated by the touch controller 140. In other words, the second touch driving circuit 134 may be activated by the touch controller 140 to drive the second touch sensors.

Here, in the period that does not overlap the second sub-period P2 in the first sub-period P1, the second gate driving circuit 124 is in a deactivated state, and the second divided image is not displayed on the second display area AA2 corresponding to the second touch area TA2.

In the second embodiment, the timing controller 150 may start the second sub-period P2 in the course of the first sub-period P1, and may activate the second gate driving circuit 124 by outputting the second start pulse VST2 to the second gate driving circuit 124.

Further, the timing controller 150 may output the second pixel data signal AA2_DISPLAY to the second data driving circuit 114 during the second sub-period P2.

The second data driving circuit 114 having received the second pixel data signal AA2_DISPLAY may convert the second pixel data signal AA2_DISPLAY into the second data voltage, and may output the converted second data voltage to the second data lines DL2.

Accordingly, the second divided image may be displayed on the second display area AA2 during the second sub-period P2. Here, in the period that overlaps the second sub-period P2 in the first sub-period P1, the first gate driving circuit 122 is in an activated state, and the first divided image is displayed even on the first display area AA1.

Meanwhile, in the period that overlaps the second sub-period P2 in the first sub-period P1, the timing controller 150 may set the first touch synchronization signal TSYNC1 to the second voltage level LV2, and may output the set second voltage level LV2 to the touch controller 140. Through this, the second touch area TA2 may be deactivated by the touch controller 140. In other words, the second touch driving circuit 134 may be activated by the touch controller 140, and may not drive the second touch sensors.

Here, the period that overlaps the second sub-period P2 in the first sub-period P1 is a period in which the first divided image is displayed on the first display area AA1, and the second divided image is displayed even on the second display area AA2 as well. Accordingly, in the period that overlaps the second sub-period P2 in the first sub-period P1, the timing controller 150 may set the second touch synchronization signal TSYNC2 to the second voltage level LV2, and may output the set second voltage level LV2 to the touch controller 140. This also allows the first touch area TA1 to be deactivated together with the second touch area TA2.

In the period that does not overlap the first sub-period P1 in the second sub-period P2, the timing controller 150 may set the second touch synchronization signal TSYNC2 to the first voltage level LV1, and may output the set first voltage level LV1 to the touch controller 140. This allows the image not to be displayed on the first display area AA1 corresponding to the first touch area TA1.

As described above, in the second embodiment, the first sub-period P1 and the second sub-period P2 may be extended within the unit frame period (1 FRAME), and the first touch area TA1 or the second touch area TA2 may be activated in the period in which the first sub-period P1 and the second sub-period P2 do not overlap each other. Thus, the time for displaying the first divided image and the time for displaying the second divided image on the unit frame image may be increased.

Meanwhile, in the second embodiment, the timing controller 150 may output the first noise compensation signal AA1_REVERSAL to the second data driving circuit 114 when outputting the first touch synchronization signal TSYNC1 of the first voltage level LV1 to the touch controller 140 as in FIG. 11.

Further, the timing controller 150 may output the second noise compensation signal AA2_REVERSAL to the first data driving circuit 112 when outputting the second touch synchronization signal TSYNC2 of the first voltage level LV1 to the touch controller 140.

Figure 12:
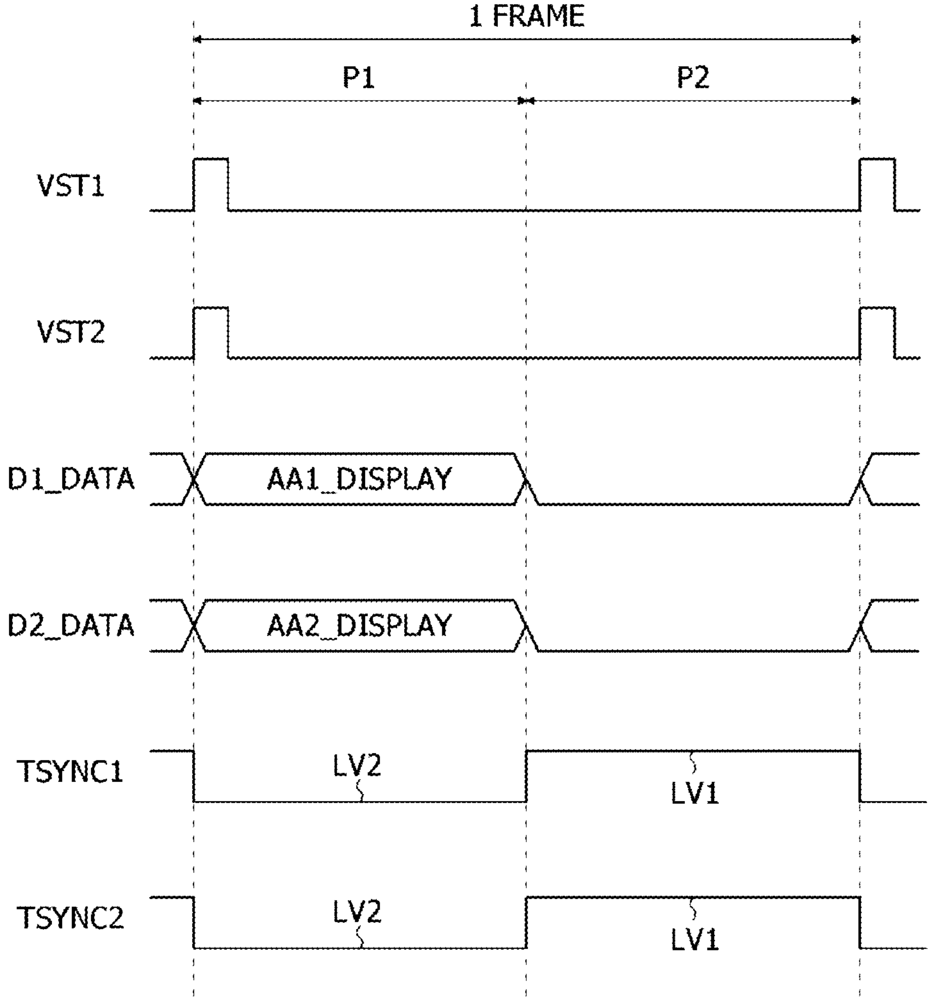
FIG. 12 is a waveform diagram showing waveforms of signals which a timing controller according to an embodiment of the present disclosure outputs according to a third embodiment.

FIG. 12 is a waveform diagram showing waveforms of signals which a timing controller according to an embodiment of the present disclosure outputs according to a third embodiment.

Referring to FIG. 12, in the first sub-period P1, the timing controller 150 may activate all of the first gate driving circuit 122 and the second gate driving circuit 124 by outputting the first gate start pulse VST1 to the first gate driving circuit 122 and outputting the second gate start pulse VST2 to the second gate driving circuit 124.

Further, the timing controller 150 may output the first pixel data signal AA1_DISPLAY to the first data driving circuit 112 and output the second pixel data signal AA2_DISPLAY to the second data driving circuit 114 as well.

The first data driving circuit 112 having received the first pixel data signal AA1_DISPLAY may convert the first pixel data signal AA1_DISPLAY into the first data voltage, and may output the converted first data voltage to the first data lines DL1.

The second data driving circuit 114 having received the second pixel data signal AA2_DISPLAY may convert the second pixel data signal AA2_DISPLAY into the second data voltage, and may output the converted second data voltage to the second data lines DL2.

Accordingly, in the first sub-period P1, the first divided image may be displayed on the first display area AA1, and the second divided image may be displayed on the second display area AA2. In other words, in the first sub-period P1, the unit frame image may be displayed.

Meanwhile, in the first sub-period P1, the timing controller 150 may output the first touch synchronization signal TSYNC1 of the second voltage level LV2 and the second touch synchronization signal TSYNC2 of the second voltage level LV2 to the touch controller 140 in order to deactivate the first touch area TA1 and the second touch area TA2.

In the second sub-period P2, the timing controller 150 may deactivate the first gate driving circuit 122 and the second gate driving circuit 124 by not outputting the first gate start pulse VST1 and the second gate start pulse VST2.

Further, the timing controller 150 may not output the first pixel data signal AA1_DISPLAY and the second pixel data signal AA2_DISPLAY.

Accordingly, in the second sub-period P2, the image is not displayed on the first display area AA1 and the second display area AA2.

Meanwhile, in the second sub-period P2, the timing controller 150 may output the first touch synchronization signal TSYNC1 of the first voltage level LV1 and the second touch synchronization signal TSYNC2 of the first voltage level LV1 to the touch controller 140 in order to activate the first touch area TA1 and the second touch area TA2.

As described above, the timing controller 150 may control to display the divided images on the first display area AA1 and the second display area AA2 in the first sub-period P1 of the unit frame period (1 FRAME), and may control to sense the user's touch input on the first touch area TA1 and the second touch area TA2 in the second sub-period P2.

In other words, the unit frame image may be displayed on the display panel 100 in the first sub-period P1, and the user's touch input may be sensed on the display panel 100 in the second sub-period P2.

As described above, in the third embodiment, since only the user's touch input is sensed on the first touch area TA1 and the second touch area TA2 in the second sub-period P2, the noise due to the divided image display on the first display area AA1 or the second display area AA2 does not occur.

Accordingly, in the second sub-period, the timing controller 150 is not required to output the noise compensation signal to the first data driving circuit 112 or the second data driving circuit 114.

Meanwhile, in an embodiment of the present disclosure, the first data driving circuit 112 may generate the first data voltage and the second noise compensation voltage by using a gamma voltage.

The second data driving circuit 114 may also generate the second data voltage and the first noise compensation voltage by using the gamma voltage.

Figure 13:
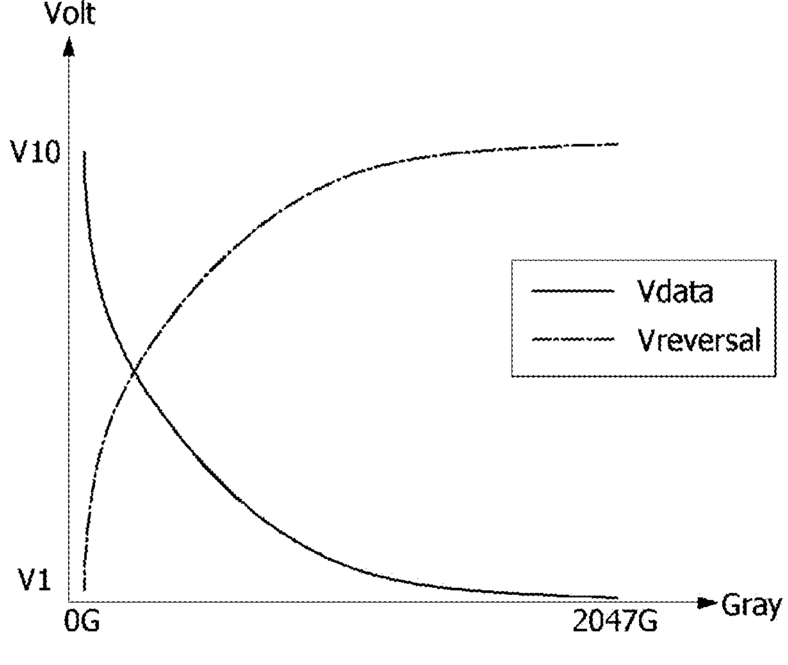
FIG. 13 is a diagram explaining the gamma curve characteristic of a data voltage and the gamma curve characteristic of a noise compensation voltage.

FIG. 13 is a diagram explaining the gamma curve characteristic of a data voltage and the gamma curve characteristic of a noise compensation voltage.

Referring to FIG. 13, if the data voltage Vdata is a voltage having the negative gamma curve characteristic in which the voltage becomes lower as the grayscale becomes higher, the noise compensation voltage Vreversal is a voltage having the positive gamma curve characteristic in which the voltage becomes higher as the grayscale becomes higher.

Figure 14:
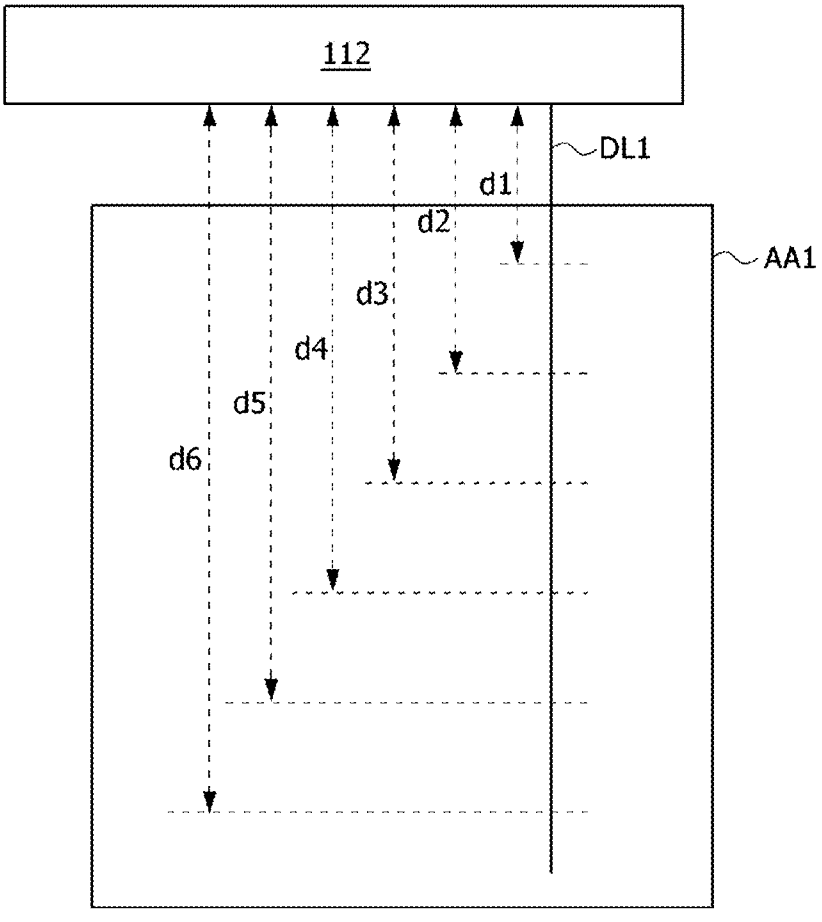
FIG. 14 is a diagram exemplarily illustrating a distance that a noise compensation voltage reaches in a first display area.
Figure 15:
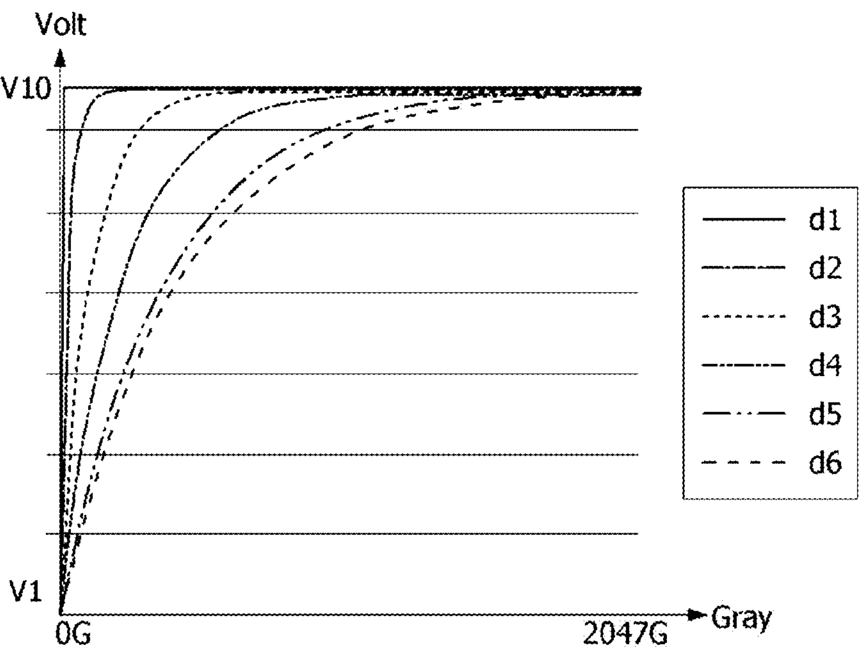
FIG. 15 is a diagram exemplarily illustrating a slow rate that is changed in accordance with a distance that a noise compensation voltage reaches.

Here, the slew rate of the second noise compensation voltage being output to respective points of the first display area AA1 is changed as in FIG. 15 in accordance with distances d1, d2, d3, d4, d5, and d6 in which the second noise compensation voltage being output from the first data driving circuit 112 reaches the respective points of the first display area AA1 as in FIG. 14.

For example, at the shortest reaching distance d1, the slew rate of the second noise compensation voltage may be the highest, and at the longest reaching distance d6, the slew rate of the second noise compensation voltage may be the lowest. In other words, the slew rate of the second noise compensation voltage may be in inverse proportional to the reaching distance.

Here, if the slew rate of the second noise compensation voltage, that is, the slew rate of the noise compensation voltage that is output from the first data driving circuit 112 or the second data driving circuit 114, is changed for each reaching distance, the noise compensation effect of the corresponding touch area TA1 or TA2 may be reduced.

Figure 16:
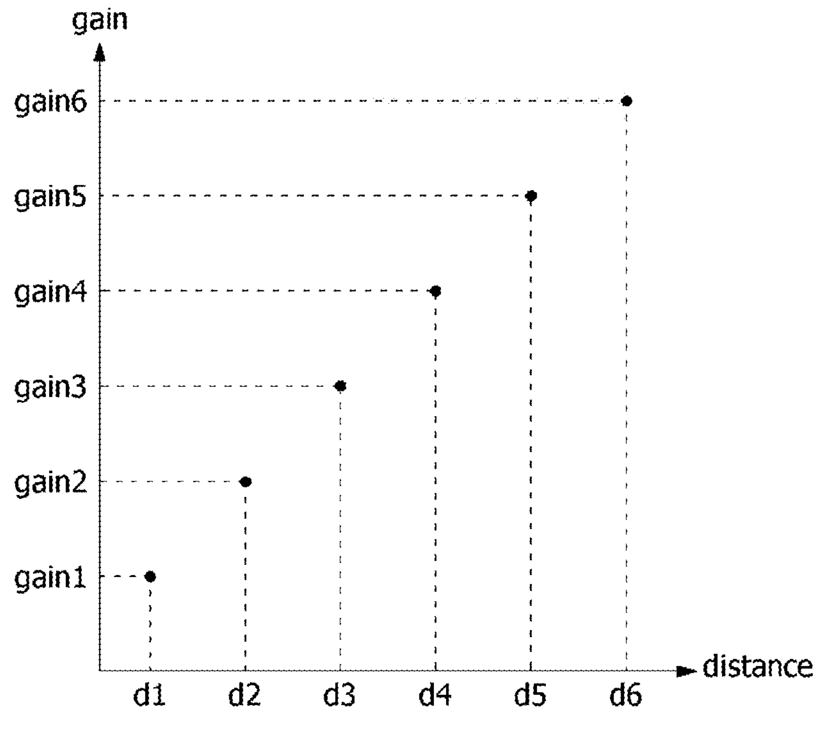
FIG. 16 is a diagram explaining a correlation between a distance that a noise compensation voltage reaches and a gamma gain.

Accordingly, in an embodiment of the present disclosure, the timing controller 150 may output a gain configuration signal for configuring a gamma gain for each reaching distance of the noise compensation voltage to the first data driving circuit 112 or the second data driving circuit 114 as in FIG. 16.

The first data driving circuit 112 or the second data driving circuit 114 may improve the slew rate change of the noise compensation voltage according to the reaching distances by raising or lowering the gamma curve characteristic according to the gain configuration signal.

Here, the timing controller 150 may store gamma gain configuration values for reaching distances of the noise compensation voltage in the form of a lookup table.

Meanwhile, the first data driving circuit 112 or the second data driving circuit 114 may include a gamma voltage generating circuit for generating the gamma voltage.

Figure 17:
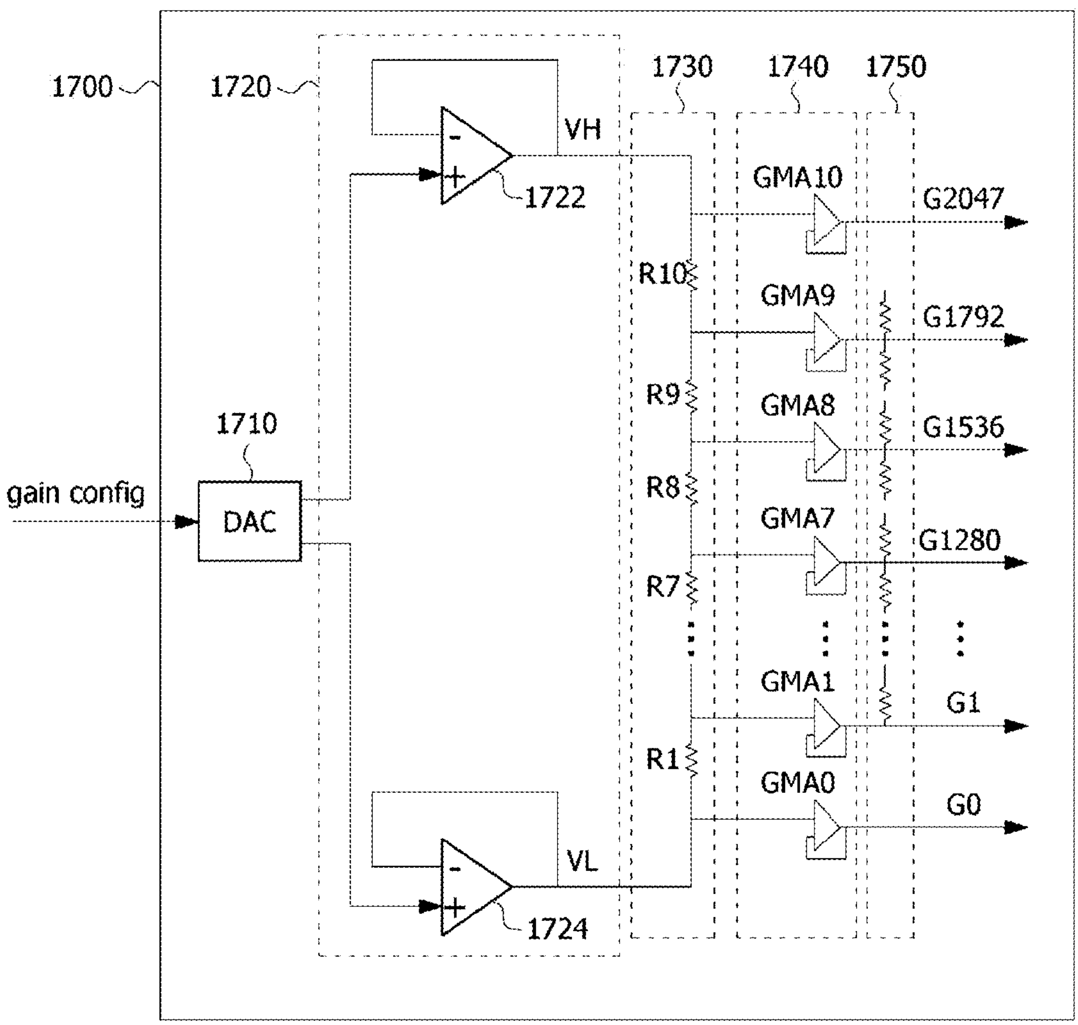
FIG. 17 is a diagram exemplarity illustrating a gamma voltage generating circuit included in a data driving circuit.

FIG. 17 is a diagram exemplarity illustrating a gamma voltage generating circuit included in a data driving circuit.

Referring to FIG. 17, a gamma voltage generating circuit 1700 may include a digital to analog converter (DAC) 1710 configured to reflect a gamma gain corresponding to a gain configuration signal (gain config) output from the timing controller 150 in a reference voltage, a maximum/minimum gamma voltage output circuit 1720 configured to output the maximum or greatest gamma voltage VH and the minimum or smallest gamma voltage VL by using the reference voltage in which the gamma gain is reflected, a first resistor array 1730 configured to output a plurality of branch voltages by using the maximum gamma voltage VH and the minimum gamma voltage VL, a gamma buffer circuit 1740 configured to output a plurality of buffering voltages through reception of the plurality of branch voltages, and a second resistor array 1750 configured to output a gamma voltage for each grayscale by branching the plurality of buffering voltages. Here, the maximum/minimum gamma voltage output circuit 1720 may include a first buffer 1722 configured to output the maximum gamma voltage VH by using the reference voltage in which the gamma gain is reflected, and a second buffer 1724 configured to output the minimum gamma voltage VL by using the reference voltage in which the gamma gain is reflected.

The above-described gamma voltage generating circuit 1700 may output the gamma voltage for each grayscale by changing the gamma gain in accordance with the gain configuration signal (gain config) input from the timing controller 150.

Figure 18:
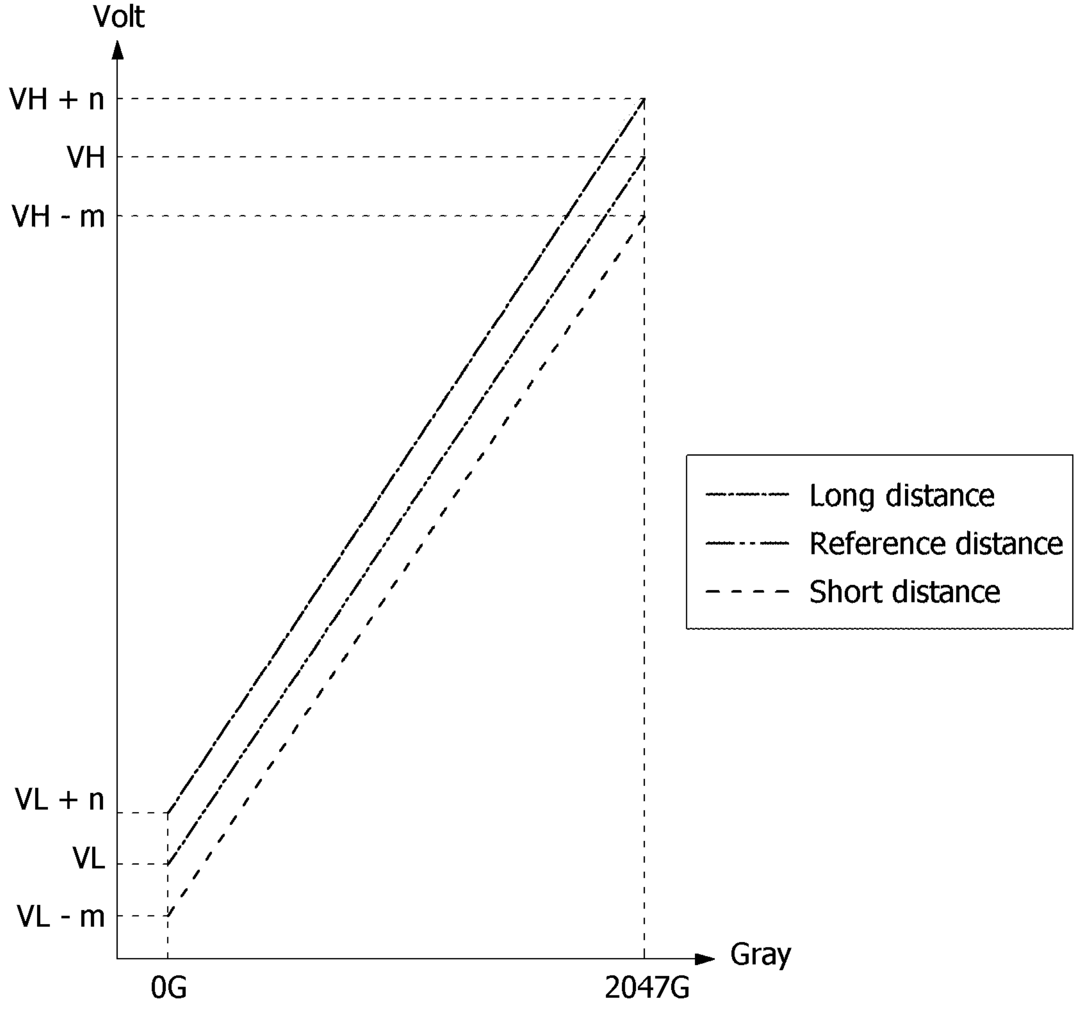
FIG. 18 is a diagram explaining a gamma curve characteristic that is adjusted in accordance with a gamma gain.

For example, in case that the gain configuration signal (gain config) is a gain configuration signal (gain config) corresponding to the reference distance, the gamma voltage generating circuit 1700 may output the gamma voltage of the minimum grayscale (e.g., G0) as the minimum gamma voltage VL as in FIG. 18 by reflecting the gamma gain corresponding to the reference distance. Further, the gamma voltage generating circuit 1700 may output the gamma voltage of the maximum grayscale (e.g., G2047) as the maximum gamma voltage VH.

In case that the gain configuration signal (gain config) is a gain configuration signal (gain config) corresponding to a short distance, the gamma voltage generating circuit 1700 may output the gamma voltage of the minimum grayscale (e.g., G0) as a voltage (VL-m) that is lower than the minimum gamma voltage VL as in FIG. 18 by reflecting the gamma gain corresponding to the short distance. Further, the gamma voltage generating circuit 1700 may output the gamma voltage of the maximum grayscale (e.g., G2047) as the voltage (VL-m) that is lower than the maximum gamma voltage VH.

In case that the gain configuration signal (gain config) is a gain configuration signal (gain config) corresponding to a long distance, the gamma voltage generating circuit 1700 may output the gamma voltage of the minimum grayscale (e.g., G0) as a voltage (VL+n) that is higher than the minimum gamma voltage VL as in FIG. 18 by reflecting the gamma gain corresponding to the long distance. Further, the gamma voltage generating circuit 1700 may output the gamma voltage of the maximum grayscale (e.g., G2047) as the voltage (VL+n) that is higher than the maximum gamma voltage VH.

Figure 19:
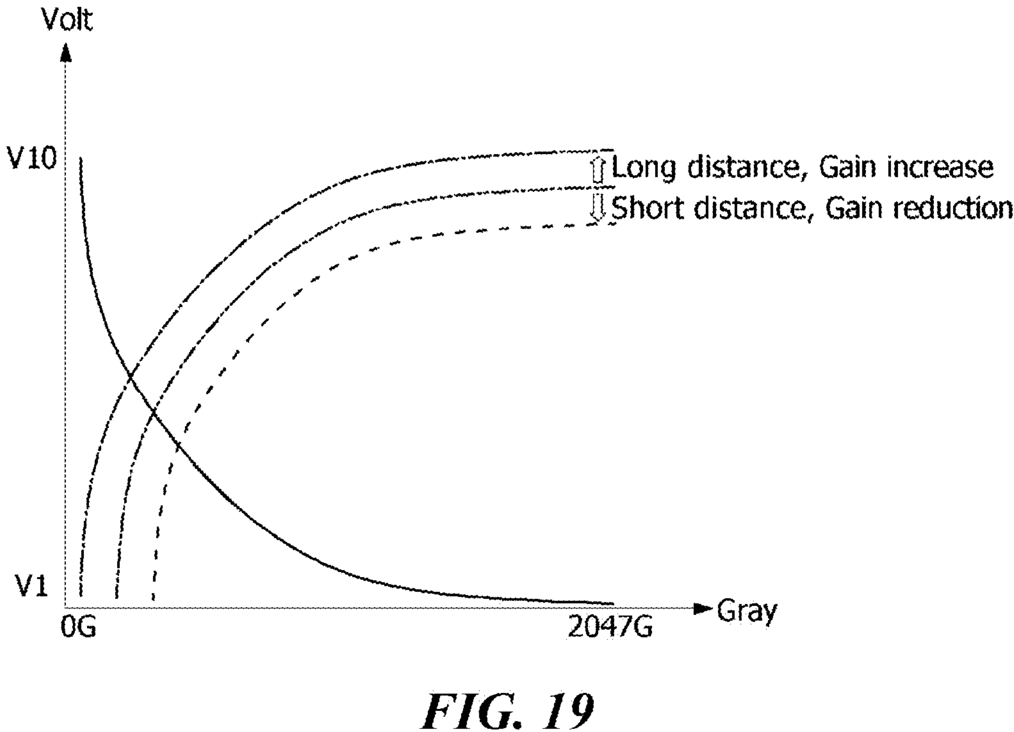
FIG. 19 is a diagram exemplarily illustrating a gamma voltage that is adjusted by a gamma gain adjustment of a timing controller according to an embodiment of the present disclosure.

As described above, the gamma voltage for each grayscale may be raised or lowered as a whole in accordance with the gain configuration signal (gain config) of the timing controller 150. Accordingly, as in FIG. 19, the gamma curve characteristic of the noise compensation voltage may be raised or lowered in accordance with the reaching distance of the noise compensation voltage, and thus the slew rate change of the noise compensation voltage may be improved.

Hereinafter, the configuration of the timing controller 150 according to an embodiment of the present disclosure will be described.

Figure 20:
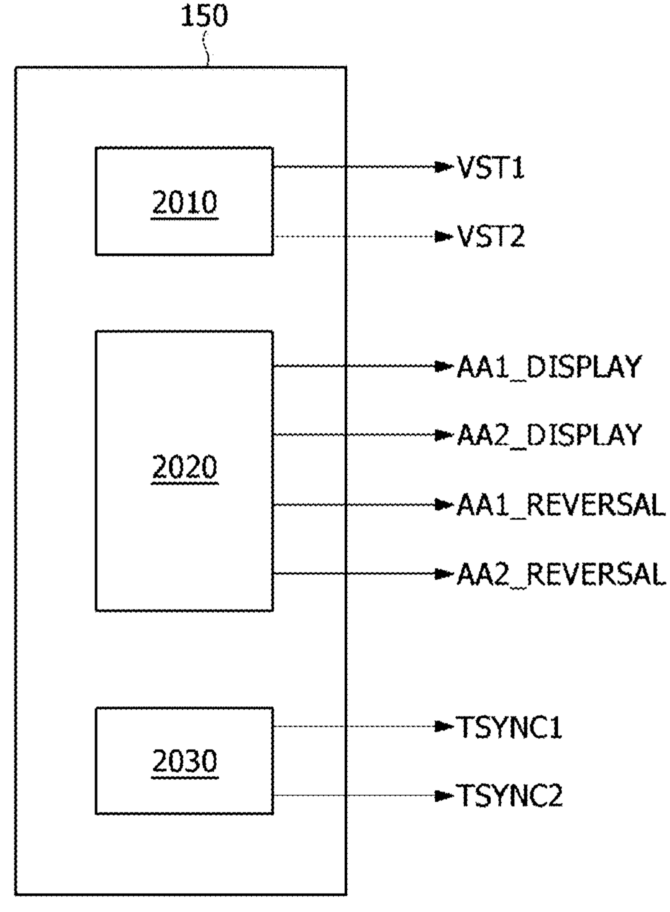
FIGS. 20 and 21 are diagrams explaining the configuration of a timing controller according to an embodiment of the present disclosure.
Figure 21:
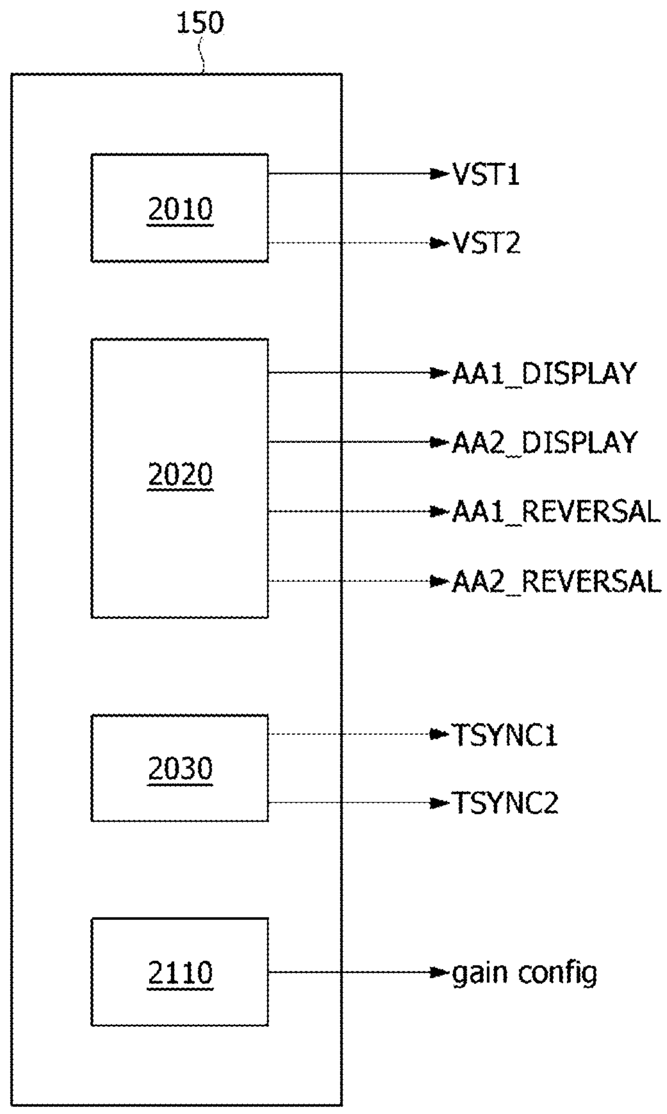

FIGS. 20 and 21 are diagrams explaining the configuration of a timing controller according to an embodiment of the present disclosure.

Referring to FIG. 20, the timing controller 150 may include a gate driving control circuit 2010, a video data output circuit 2020, and a touch timing control circuit 2030. Further, the timing controller 150 may further include a gain configuration circuit 2110 as in FIG. 21.

The gate driving control circuit 2010 may activate the first gate driving circuit 122 in the first sub-period P1 of the unit frame period (1 FRAME). The first gate driving circuit 122 that is activated in the first sub-period P1 may sequentially output the gate signals to the first display area AA1 of the display panel 100.

Here, the gate driving control circuit 2010 may activate the first gate driving circuit 122 by outputting the first start pulse VST1 to the first gate driving circuit 122 at a starting point of the first sub-period P1.

Further, the gate driving control circuit 2010 may activate the second gate driving circuit 124 in the second sub-period P2. The second gate driving circuit 124 that is activated in the second sub-period P2 may sequentially output the gate signals to the second display area AA2 of the display panel 100.

Here, the gate driving control circuit 2010 may activate the second gate driving circuit 124 by outputting the second start pulse VST2 to the second gate driving circuit 124 at a starting point of the second sub-period P2.

The gate driving control circuit 2010 may activate the first gate driving circuit 122 and the second gate driving circuit 124 in the first sub-period P1, and may deactivate the first gate driving circuit 122 and the second gate driving circuit 124 in the second sub-period P2.

Here, the gate driving control circuit 2010 may activate the first gate driving circuit 122 and the second gate driving circuit 124 by outputting the first start pulse VST1 to the first gate driving circuit 122 and outputting the second start pulse VST2 to the second gate driving circuit 124 at the starting point of the first sub-period P1.

The gate driving control circuit 2010 may include a level shifter, and may output the first start pulse VST1 and the second start pulse VST2 through the level shifter.

The video data output circuit 2020 may output the first pixel data signal AA1_DISPLAY corresponding to the first divided image that is displayed on the first display area AA1 among the unit frame images to the first data driving circuit 112 in the first sub-period P1.

Further, the video data output circuit 2020 may output the second pixel data signal AA2_DISPLAY corresponding to the second divided image that is displayed on the second display area AA2 among the unit frame images to the second data driving circuit 114 in the second sub-period P2.

The video data output circuit 2020 may output the first noise compensation signal AA1_REVERSAL having the phase opposite to the phase of the first pixel data signal AA1_DISPLAY to the second data driving circuit 114 when the first divided image is displayed on the first display area AA1 in the first sub-period P1. Due to this, the noise component that is generated on the second touch area TA2 may be compensated for by the first divided image displayed on the first display area AA1. Here, the noise component of the second touch area TA2 may be the first coupling voltage that is transferred to the low-voltage power wires of the second display area AA2 corresponding to the second touch area TA2. The first coupling voltage may be a voltage that is equal or similar to the first data voltage corresponding to the first divided image.

When the video data output circuit 2020 outputs the first noise compensation signal AA1_REVERSAL to the second data driving circuit 114 as described above, the gate driving control circuit 2010 may deactivate the second gate driving circuit 124.

Meanwhile, the video data output circuit 2020 may output the second noise compensation signal AA2_REVERSAL having the phase opposite to the phase of the second pixel data signal AA2_DISPLAY to the second data driving circuit 114 when the second divided image is displayed on the second display area AA2 in the second sub-period P2. Due to this, the noise component that is generated on the first touch area TA1 may be compensated for by the second divided image displayed on the second display area AA2. Here, the noise component of the first touch area TA1 may be the second coupling voltage that is transferred to the low-voltage power wires of the first display area AA1 corresponding to the first touch area TA1. The second coupling voltage may be a voltage that is equal or similar to the second data voltage corresponding to the second divided image.

When the video data output circuit 2020 outputs the second noise compensation signal AA2_REVERSAL to the first data driving circuit 112 as described above, the gate driving control circuit 2010 may deactivate the second gate driving circuit 124.

In the first sub-period P1, the video data output circuit 2020 may output the first pixel data signal AA1_DISPLAY to the first data driving circuit 112, and may output the second pixel data signal AA2_DISPLAY to the second data driving circuit 114.

In the second sub-period P2, the video data output circuit 2020 does not output the first pixel data signal AA1_DISPLAY and the second pixel data signal AA2_DISPLAY.

The touch timing control circuit 2030 may output the first touch synchronization signal TSYNC1 for activating the second touch area TA2 corresponding to the second display area AA2 in the first sub-period P1. In other words, the touch timing control circuit 2030 may output the first touch synchronization signal TSYNC1 of the first voltage level LV1 to the touch controller 140.

The touch timing control circuit 2030 may output the second touch synchronization signal TSYNC2 for activating the first touch area TA1 corresponding to the first display area AA1 in the second sub-period P2. In other words, the touch timing control circuit 2030 may output the second touch synchronization signal TSYNC2 of the first voltage level LV1 to the touch controller 140.

Here, the second sub-period P2 may start at an end point of the first sub-period P1, and may end at an end point of the unit frame period (1 FRAME).

The touch timing control circuit 2030 may output the second touch synchronization signal TSYNC2 of the second voltage level LV2 to the touch controller 140 in the first sub-period P1. Due to this, the first touch area TA1 may be deactivated in the first sub-period P1.

Further, the touch timing control circuit 2030 may output the first touch synchronization signal TSTNC1 of the second voltage level LV2 to the touch controller 140 in the second sub-period P2. Due to this, the second touch area TA2 may be deactivated in the second sub-period P2.

Meanwhile, in case that a portion of the first sub-period P1 overlaps a portion of the second sub-period P2 through starting of the second sub-period P2 before ending of the first sub-period, the touch timing control circuit 2030 may output the first touch synchronization signal TSYNC1 with the first voltage level LV1 in a period that does not overlap the second sub-period P2 in the first sub-period P1. Due to this, the touch controller 140 may activate the second touch area TA2.

Further, in a period that overlaps the second sub-period P2 in the first sub-period P1, the touch timing control circuit 2030 may output the first touch synchronization signal TSYNC1 with the second voltage level LV2 that is different from the first voltage level LV1. Due to this, the touch controller 140 may deactivate the second touch area TA2.

Meanwhile, in case that the video data output circuit 2020 outputs the first pixel data signal AA1_DISPLAY to the first data driving circuit 112 and outputs the second pixel data signal AA2_DISPLAY to the second data driving circuit 114 in the first sub-period P1, the touch timing control circuit 2030 may output the first touch synchronization signal TSYNC1 of the second voltage level LV2 and the second touch synchronization signal TSYNC2 of the second voltage level LV2 to the touch controller 140 in the first sub-period. Due to this, the first touch area TA1 and the second touch area TA2 may be deactivated in the first sub-period P1.

Further, in the second sub-period P2, the touch timing control circuit 2030 may output the first touch synchronization signal SYNC1 of the first voltage level LV1 and the second touch synchronization signal TSYNC2 of the first voltage level LV1 to the touch controller 140. Due to this, the first touch area TA1 and the second touch area TA2 may be activated in the second sub-period P2.

The gain configuration circuit 2110 that is further included in the timing controller 150 as in FIG. 21 may output a gain configuration signal (gain config) for configuring a gamma gain for each reaching distance of the noise compensation voltage to the first data driving circuit 112 or the second data driving circuit 114.

Here, the gain configuration circuit 2110 may store the gamma gain configuration value for each reaching distance of the noise compensation voltage in the form of a lookup table.

The technical features and improvements to be achieved by the present disclosure, the means for achieving the same, and effects of the present disclosure described above do not specify essential features of the claims, and, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

DESCRIPTION OF REFERENCE NUMERALS

100: Display panel
101: Pixel circuit
112: First data driving circuit
114: Second data driving circuit
122: First gate driving circuit
124: Second gate driving circuit
132: First touch driving circuit
134: Second touch driving circuit
140: Touch controller
150: Timing controller
1700: Gamma voltage generation circuit
1710: DAC
1720: Max/minimum gamma voltage output circuit
1722: First buffer
1724: Second buffer
1730: First resistor array
1740: Gamma buffer circuit
1750: Second resistor array
2010: Gate driving control circuit
2020: Image data output circuit
2030: Touch timing control circuit
2110: Gain setting circuit The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for driving a display device, comprising the steps of:

sensing a touch input on a second display area while no pixel data is written to second pixels in the second display area and first pixel data is written on first pixels in a first display area; and sensing a touch input on the first display area while no pixel data is written to the first pixels in the first display area and second pixel data is written on the second pixels in the second display area.

2. The method of claim 1, comprising, when sensing the touch input on the second display area, applying a first data voltage corresponding to the first pixel data to first data lines in the first display area.

3. The method of claim 2, comprising applying a first noise compensation voltage having a phase opposite to a phase of the first data voltage to second data lines in the second display area to compensate for a noise component that is generated in the second display area by the first data voltage when the first pixel data is written on the first pixels.

4. The method of claim 3, wherein the first data lines and the second data lines are physically separated from each other, and the first noise compensation voltage is not transferred to the first data lines.

5. The method of claim 1, comprising when sensing the touch input on the first display area, applying a second data voltage corresponding to the second pixel data to second data lines in the second display area.

6. The method of claim 5, comprising applying a second noise compensation voltage having a phase opposite to a phase of the second data voltage to first data lines in the first display area to compensate for a noise component that is generated in the first display area by the second data voltage when the second pixel data is written on the second pixels.

7. The method of claim 6, wherein the display device is configured to electrically connect the second data lines and the second pixels to each other, and to electrically separate the first data lines and the first pixels from each other.

8. A display device comprising:

a display panel including a first display area in which a plurality of first pixels are disposed and a second display area in which a plurality of second pixels are disposed, the plurality of second pixels being electrically separated from the first pixels;

a first display area driver configured to write first pixel data on first pixels in the first display area;

a second display area driver configured to write second pixel data on second pixels in the second display area;

first touch sensors disposed on the first display area;

second touch sensors disposed on the second display area; and a touch sensor driver configured to sense a touch input on the second display area by driving the second touch sensors while the first pixel data is written on the first pixels and the second display area driver is deactivated, and to sense a touch input on the first display area by driving the first touch sensors while the second pixel data is written on the second pixels and the first display area driver is deactivated.

9. The display device of claim 8, wherein:

the first display area driver comprises:

a first gate driving circuit configured to output a gate signal to the first display area; and a first data driving circuit configured to output a first data voltage corresponding to the first pixel data to first data lines disposed in the first display area, and the second display area driver comprises:

a second gate driving circuit configured to output a gate signal to the second display area; and a second data driving circuit configured to output a second data voltage corresponding to the second pixel data to second data lines disposed in the second display area.

10. The display device of claim 9, wherein in operation, when the touch sensor driver drives the second touch sensors, the second gate driving circuit is configured not to output the gate signal to the second display area, and the second data driving circuit is configured to output a first noise compensation voltage having a phase opposite to a phase of the first data voltage to the second data lines to compensate for a noise component that is generated in the second touch sensors by the first data voltage.

11. The display device of claim 10, wherein the first data lines and the second data lines are physically separated from each other, and the first noise compensation voltage is not configured to be transferred to the first data lines.

12. The display device of claim 9, wherein in operation, when the touch sensor driver drives the first touch sensors, the first gate driving circuit is configured not to output the gate signal to the first display area, and the first data driving circuit is configured to output a second noise compensation voltage having a phase opposite to a phase of the second data voltage to the first data lines to compensate for a noise component that is generated in the first touch sensors by the second data voltage.

13. The display device of claim 8, wherein the touch sensor driver comprises:

a first touch driving circuit configured to drive the first touch sensors while the second pixel data is written on the second pixels; and a second touch driving circuit configured to drive the second touch sensors while the first pixel data is written on the first pixels.

14. The display device of claim 13, wherein a portion of a first period in which the first pixel data is written on the first pixels and a portion of a second period in which the second pixel data is written on the second pixels overlap each other.

15. The display device of claim 14, wherein the second touch driving circuit is configured to drive the second touch sensors in a period in the first period that does not overlap the second period, and not to drive the second touch sensors in a period that overlaps the second period.

16. The display device of claim 14, wherein the first touch driving circuit is configured not to drive the first touch sensors in a period in the second period that overlaps the first period, and to drive the first touch sensors in a period that does not overlap the first period.

* * * * *